United States Patent [19]
Ohashi

[11] Patent Number: 5,946,160
[45] Date of Patent: Aug. 31, 1999

[54] RELATIVE-POSITION MEASURING SYSTEM OF RECORDING-MEDIUM LIBRARY APPARATUS

[75] Inventor: Hiroki Ohashi, Kato-gun, Japan

[73] Assignee: Fujitsu Limited, Kanagawa, Japan

[21] Appl. No.: 08/821,919

[22] Filed: Mar. 21, 1997

[30] Foreign Application Priority Data

Oct. 28, 1996 [JP] Japan .................................. 8-285508

[51] Int. Cl.$^6$ .................................................. G11B 15/68
[52] U.S. Cl. ................................ 360/92; 360/71; 369/34
[58] Field of Search ................................ 360/71, 69, 92; 369/34; 414/225, 226, 268, 273, 274, 275, 276, 279, 280, 282, 283

[56] References Cited

U.S. PATENT DOCUMENTS

| | | | |
|---|---|---|---|
| 5,303,034 | 4/1994 | Carmichael | 360/71 X |
| 5,647,717 | 7/1997 | Yokogawa et al. | 414/273 |
| 5,703,843 | 12/1997 | Katsuyama et al. | 369/34 |
| 5,790,338 | 8/1998 | Kanai et al. | 360/71 |

*Primary Examiner*—Aristotelis M. Psitos
*Assistant Examiner*—James L Habermehl
*Attorney, Agent, or Firm*—Armstrong, Westman Hattori, McLeland & Naughton

[57] ABSTRACT

A relative-position measuring system of a recording-medium library apparatus including first to third reference flags installed for measuring the magnitude of the gradient of an accessor and a plurality of relative-position flags provided at a cell drum. A flag sensor for detecting the first to third reference flags is installed on a hand mechanism of the accessor for finding the gradients of the accessor with respect to Y and Z axes. The gradients of the accessor with respect to Y and Z axes are used for correcting design tachometer count values of the relative-position flags to give theoretical tachometer count values which are stored in a memory unit. When the accessor is moved, the relative-position flags are sensed by the flag sensor. Actual tachometer count values which are actually obtained when the relative-position flags are detected by the flag sensor are also stored in the memory unit. Then, difference data between the theoretical tachometer count values and the actual tachometer count values is calculated and stored in the memory unit as well.

7 Claims, 33 Drawing Sheets

FIG. 27

| EE | 01 | 02 | 03 | 04 | 05 | 06 | 07 | 08 |

First
flag row

| EE | 09 | 0A | 0B | 0C | 0D | 0E | 0F | 10 | FF |

Next
flag row

RELATIVE-POSITION MEASURING SYSTEM OF RECORDING-MEDIUM LIBRARY APPARATUS

BACKGROUND OF THE INVENTION

1. Field of the Invention

In general, the present invention relates to a recording-medium library apparatus comprising a rotary cell drum having a plurality of cells each for accommodating a recording-medium cartridge. In particular, the present invention relates to a relative-position measuring system of a recording-medium library apparatus.

2. Description of the Related Art

A magnetic-tape drive is available as one of external storage devices of a computer. Most of the magnetic-tape drives adopt an open-reel technique using a tape with a width of 0.5 inches. However, the operation of such a magnetic-tape drive is cumbersome. Therefore, an autoloading apparatus, that is capable of automatically mounting a tape once the reel is set on a pan, is becoming popular. On the other hand, also widely used is a magnetic-tape recording-medium cartridge which utilizes a tape with the same width as the open reel and automatically pulls the tape from a container to be loaded into a magnetic-tape drive so as to reduce the amount of a work load borne by the operator.

As many magnetic-tape recording-medium cartridges as required are entered in a magnetic-tape library apparatus and selectively loaded into a magnetic-tape drive unit for allowing data to be written into or read out from the loaded magnetic-tape recording-medium cartridge. The magnetic-tape library apparatus comprises a cell unit having a plurality of cells each for accommodating a magnetic-tape recording-medium cartridge, a magnetic-tape drive unit for writing or reading out data into or from a loaded magnetic-tape recording-medium cartridge and an accessor for conveying a magnetic-tape recording-medium cartridge between the cell unit and the magnetic-tape drive unit.

The magnetic-tape library apparatus further includes a recording-medium cartridge access station (CAS) provided therein for entering and ejecting a magnetic-tape recording-medium cartridge. The CAS comprises a recording-medium cartridge entering unit and recording-medium cartridge ejecting unit. In recent years, such a magnetic-tape library apparatus is widely used as a large-capacity external storage device of a computer. It is necessary for such a magnetic-tape library apparatus to operate with a high degree of reliability even if the magnetic-tape library apparatus is used as an unattended system.

A rotary cell drum which is rotated by a driving means is known as one of cell units. Before a magnetic-tape recording-medium cartridge is entered by the accessor into a target cell of the cell drum, the cell drum is rotated so that the target cell is moved to a position that can be accessed by the accessor. A large-size magnetic-tape library apparatus comprises a plurality of independent frames which are connected to each other. Each frame comprises, among other components, a cell drum and a magnetic-tape drive unit. The number of geometrical errors which result among components composing the mechanism when such a large-size magnetic-tape library apparatus is assembled is large, making it impossible to accurately position a cell of a cell drum with respect to the accessor by merely relying on mechanical design values. In order to solve this problem, relative-position measurement is carried out as a means for correcting such a positional discrepancy.

In the conventional relative-position measuring system, a plurality of edges of a cell drum having a heptagonal cross section are detected by means of a flag sensor installed ll hand mechanism of an accessor in order to measure the positions of the cells of the cell drum relative to the accessor. In such a conventional relative-position measuring system, since a relative position is measured by detecting the edge of a cell drum by using a reflective-type sensor as a flag sensor, the accuracy of the measurement is poor and, in some cases, the relative-position measurement ends in a failure.

In the case of a small-size magnetic-tape library apparatus, the density of cells in the cell drum is not so high so that there is a sufficient gap for entering the hand of the accessor in each cell. As a result, the accessor can be positioned correctly with respect to each cell even if the relative-position measurement itself is considered to be rough. In the case of a large-size magnetic-tape library apparatus, on the other hand, a plurality of cells need to be laid out in the cell drum at a high density, making it impossible to provide a large space for entering the hand of the accessor into each cell.

As a result, the magnitude of an error between a position of a cell relative to the accessor as recognized by the accessor and the actually measured relative position increases, giving rise to a problem that the recording-medium cartridge can not be inserted in or taken out from a cell. This problem is a specially serious problem for a large-size magnetic-tape library apparatus which comprises a plurality of independent frames connected to each other because a connection error among the frames also exists. It is therefore necessary to measure a position of each cell of a cell drum relative to an accessor with a high degree of accuracy.

SUMMARY OF THE INVENTION

It is therefore an object of the present invention to provide a relative-position measuring system of a recording-medium library apparatus capable of measuring a position of each cell of a cell drum relative to an accessor of the magnetic-tape library apparatus with a high degree of accuracy.

In accordance with one aspect of the present invention, there is provided a relative-position measuring system of a recording-medium library apparatus including: a housing; a cell drum which is rotatably installed in said housing and has a plurality of cells each for accommodating a recording-medium cartridge; a drive unit for writing and reading out data into and from said recording-medium cartridge; an X rail which is installed in said housing and has an X axis extended in a horizontal direction; and an accessor for conveying said recording-medium cartridge between said cell drum and said drive unit by moving said accessor along said X axis, said accessor having a hand mechanism movable in the vertical direction along a Y column extended in the vertical direction and rotatable around a Y axis parallel to said Y column; said relative-position measuring system comprising: a first reference flag installed at a front lower portion of said housing; a second reference flag installed above said first reference flag; a third reference flag which is installed at a rear lower portion of said housing in such a way that a straight line connecting said third reference flag to said first reference flag forms a right angle with said X rail; a plurality of relative-position flags installed at said cell drum; a home sensor installed on said X rail for detecting a home position of said accessor; a flag sensor installed at said hand mechanism for detecting said first to third reference flags and said relative-position flags; a first motor for moving said accessor along said X rail and, at the same time, generating a train of first tachometer pulses; a first tachometer counter for counting said first tachometer pulses; a second motor for moving said hand mechanism along said Y column and, at the same time, generating a train of second tachometer pulses; a second tachometer counter for counting said second tachometer pulses; a third motor for rotating said hand mechanism around said Y axis and, at the same time, generating a train of third tachometer pulses; a third tachometer counter for counting said third tachometer pulses; a means for finding a gradient of said Y axis of said accessor with respect to an X direction and gradients of a Z axis defined as a straight line connecting a rotation start point to a rotation end point of said hand mechanism with respect to said X direction and with respect to a Y direction by detection of said first to third reference flags using said flag sensor; a means for finding first theoretical tachometer count values by correction of design tachometer count values of said reference-position flags using said gradients of said Y and Z axes of said accessor and storing said first theoretical tachometer count values; a means for storing first actual tachometer count values of said first to third tachometer counters which are obtained when said relative-position flags are detected by said flag sensor; and a means for finding difference data between said first actual tachometer count values and said first theoretical tachometer count values and storing said difference data as first correction values.

It is desirable to provide a relative-position flag for each cell block which includes a predetermined number of cells and to correct the coordinates of each cell in the cell block by using correction values associated with the relative-position flag provided for the cell block.

In accordance with the relative-position measuring system provided by the present invention, there is further provided a means for checking the gradient angle of a frame and storing the gradient angle as a correction value. A recording-medium cartridge can therefore be entered into or taken out from a cell by the hand mechanism of the accessor even if the frame of the accessor is inclined with respect to the Z direction.

In accordance with the present invention, there is further provided a relative-position measuring system of a recording-medium library apparatus capable of measuring a relative position after replacement of an accessor and after replacement of a home sensor in a short period of time.

In accordance with another aspect of the present invention, there is provided a recording-medium library apparatus comprising: a housing including a plurality of independent frames joined to each other; a cell drum which is rotatably installed in said housing and has a plurality of cells each for accommodating a recording-medium cartridge; a drive unit installed in said housing for writing and reading out data into and from said recording-medium cartridge; an X rail installed in said housing extended in a horizontal direction; an accessor for conveying said recording-medium cartridge between said cell drum and said drive unit by moving said accessor along said X axis, said accessor including a Y column extended in the vertical direction and a hand mechanism movable in the vertical direction along said Y column and rotatable around a Y axis parallel to said Y column; a first reference flag installed at a front lower portion of said housing; a second reference flag installed above said first reference flag; a third reference flag which is installed at a rear lower portion of said housing in such a way that a straight line connecting said third reference flag to said first reference flag forms a right angle with said X rail; a plurality of relative-position flags installed at said cell drum; a home sensor installed on said X rail for detecting a home position of said accessor; and a flag sensor installed at said hand mechanism for detecting said first to third reference flags and said relative-position flags.

The above and other objects, features as well as many of the attendant advantages of the present invention and the manner of realizing them will become more apparent and the present invention will be best understood from a careful study of the following detailed description and appended claims with reference to attached drawings showing some preferred embodiments of the present invention.

BRIEF DESCRIPTION OF THE DRAWINGS

Preferred embodiments will be described in detail by referring to drawings of the following figures wherein:

FIG. 27 is a diagram showing a typical relative-position flag measurement table;

DESCRIPTION OF THE PREFERRED EMBODIMENTS

Figure 1:
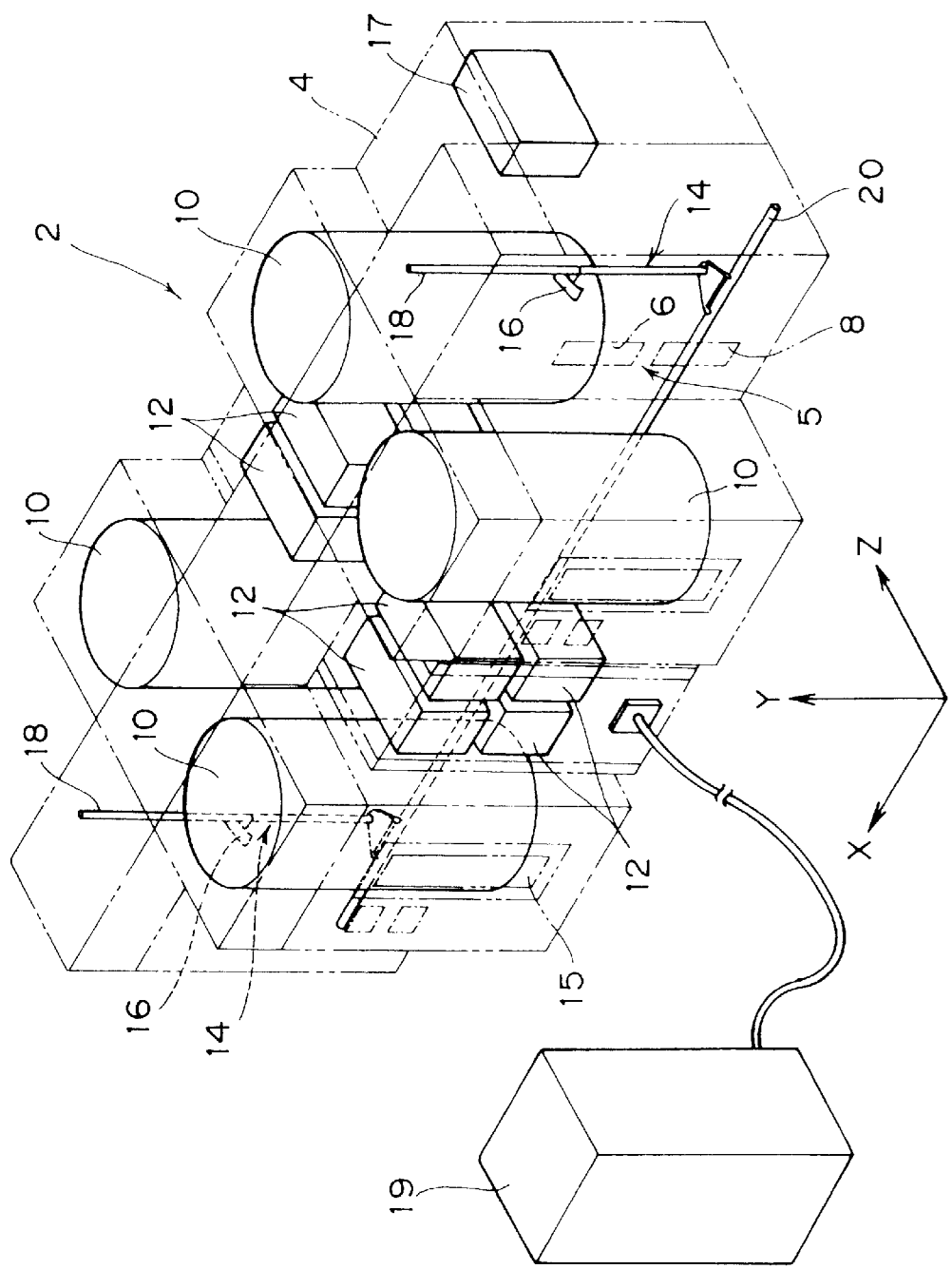
FIG. 1 is a seeing-though diagram showing a recording-medium library apparatus.

The present invention will become more apparent from the following detailed description of preferred embodiments with reference to the accompanying diagrams showing the embodiments. FIG. 1 is a skeleton seeing-though diagram showing a recording-medium library apparatus. As shown in the figure, a housing 4 of the recording-medium library apparatus 2 has a configuration for accommodating a plurality of independent frames connected to each other. A recording-medium cartridge access station (CAS) 5 is provided on the front-surface side of the housing 4 of the recording-medium library apparatus 2. The recording-medium cartridge access station 5 has a recording-medium cartridge enter window 6 and a recording-medium cartridge eject window 8. The recording-medium cartridge enter window 6 and the recording-medium cartridge eject window 8 are rotatable around a vertical axis by 180 degrees.

Reference numeral 10 is a cell drum having a plurality of cells. Having a heptagonal cross section, each cell drum 10 comprises seven segments. Reference numeral 12 is a drive unit for recording and playing back information into and from a recording-medium cartridge. The recording-medium library apparatus provided by the present embodiment has eight drive units 12. Also provided inside the housing 4 are two accessors 14 each for conveying a recording-medium cartridge among the recording-medium cartridge access station 5, the cell drums 10 and the drive units 12.

Each of the accessors 14 has an accessor hand mechanism 16 movable in the upward and downward directions along a vertical column 18. Each of the accessors 14 is movable in the horizontal direction along an X rail 20 extended in an X-axis direction. In the recording-medium library apparatus 2, there is further provided a recording-medium cartridge direct enter/eject mechanism (DEF) 15 capable of directly entering and ejecting a plurality of recording-medium cartridges into and from cells of the cell drum 10. Reference numeral 17 is an accessor control unit for controlling the accessors 14. As will be described later, the accessor control unit 17 comprises an accessor controller and an assessor-servo controller. Reference numeral 19 is a drive controller for controlling the drive units 12.

Figure 2:
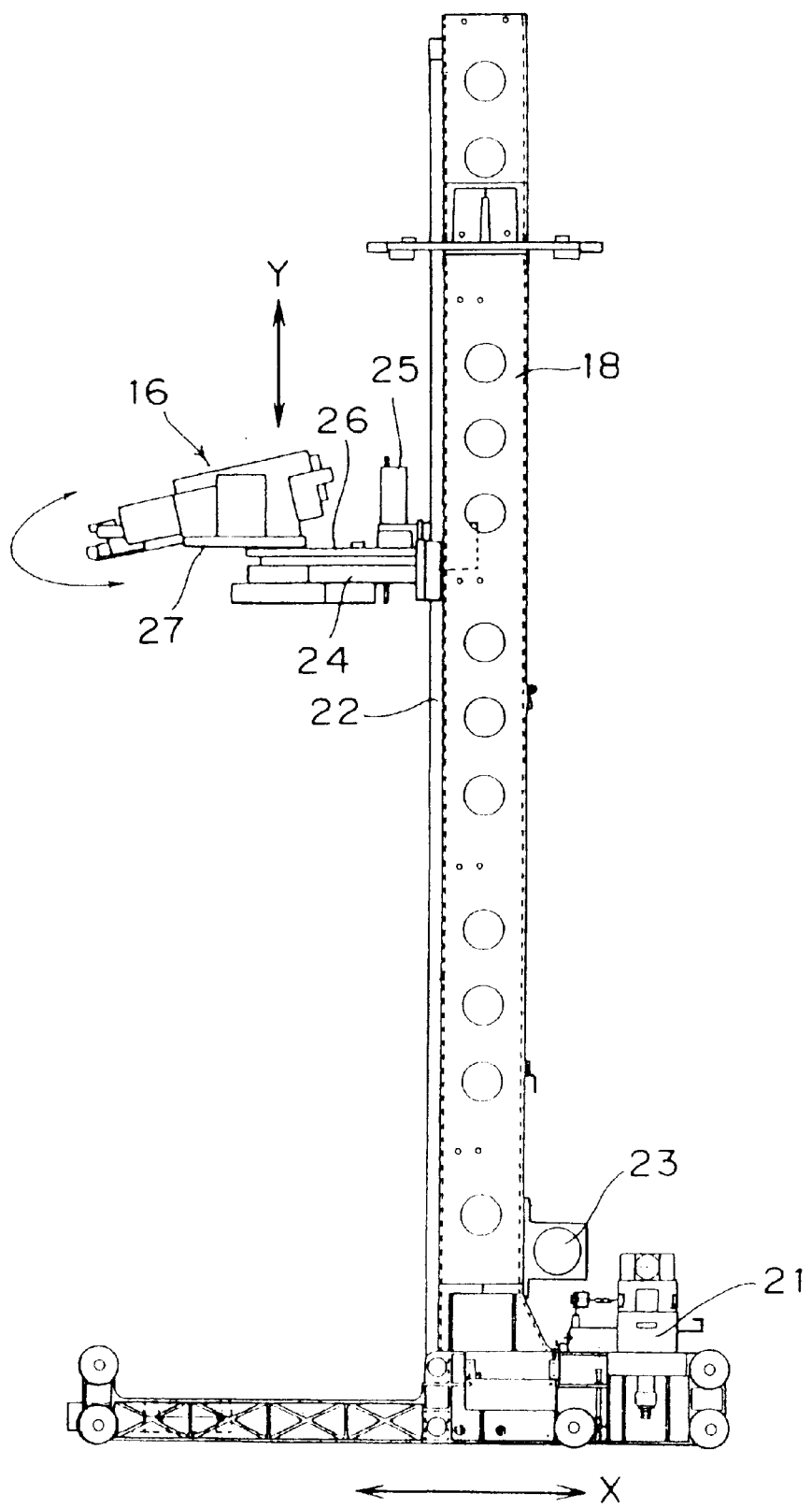
FIG. 2 is a diagram showing a front view of an accessor employed in the recording-medium library apparatus shown in FIG. 1.

FIG. 2 is a diagram showing a front view of the accessor 14 employed in the recording-medium library apparatus shown in FIG. 1. The accessor 14 is driven by a motor 21 to move along the X rail 20 in the X-axis direction. The motor 21 generates a predetermined number of tachometer pulses in each rotation thereof. A support base 24 for mounting the accessor hand mechanism 16 is driven by a motor 23 to move along a guide rail 22 formed in the vertical column 18 in the upward and downward directions. Much like the motor 21, the motor 23 also generates a predetermined number of tachometer pulses in each rotation thereof. A motor 25 is mounted on the support base 24. A timing belt 26 linked to the output shaft of the motor 25 rotates the accessor hand mechanism 16 around a vertical axis (also known as a Y axis). Much like the motors 21 and 23, the motor 25 also generates a predetermined number of tachometer pulses in each rotation thereof.

Figure 3:
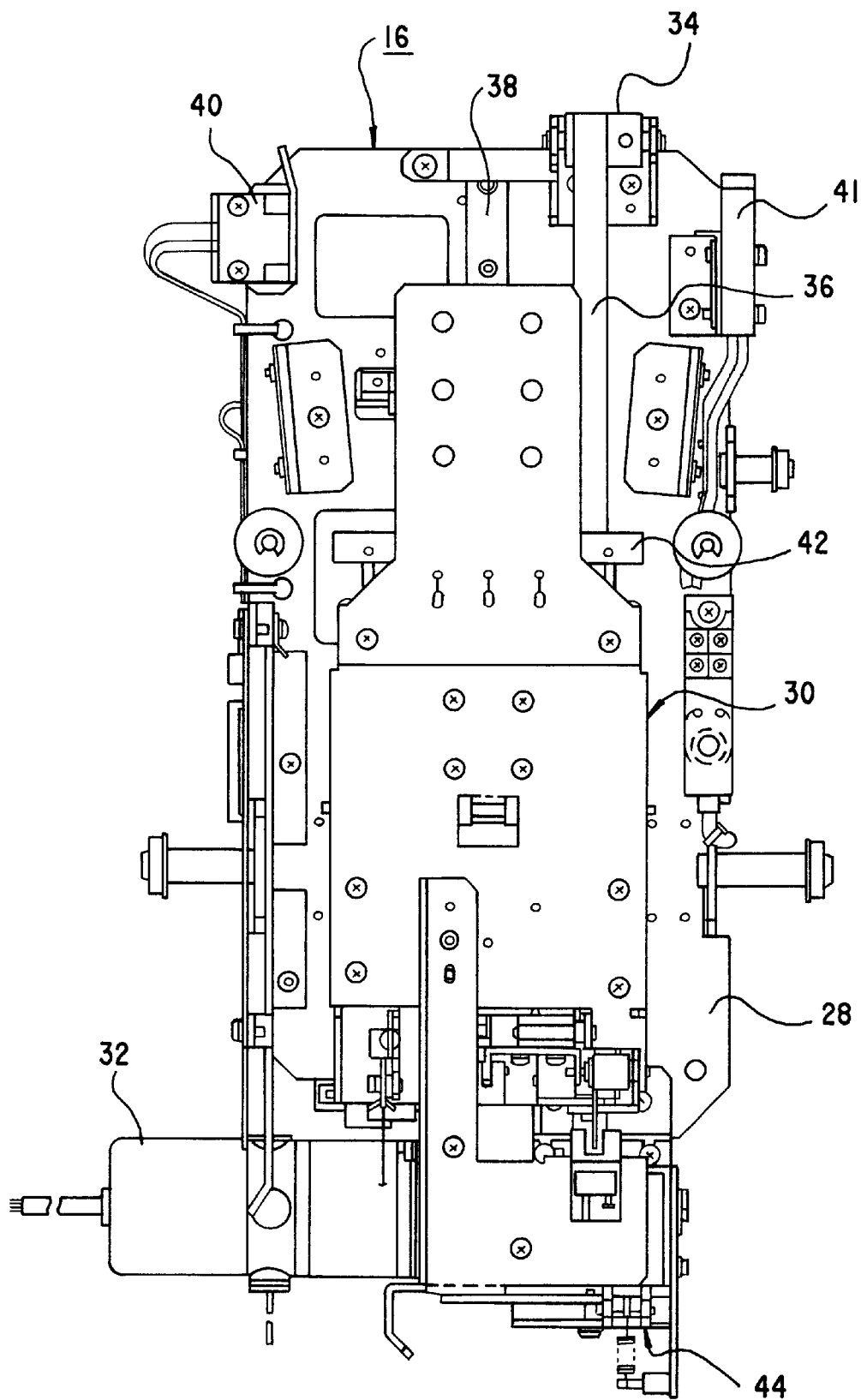
FIG. 3 is a diagram showing a horizontal cross section of a hand mechanism employed in the accessor shown in FIG. 2.
Figure 4:
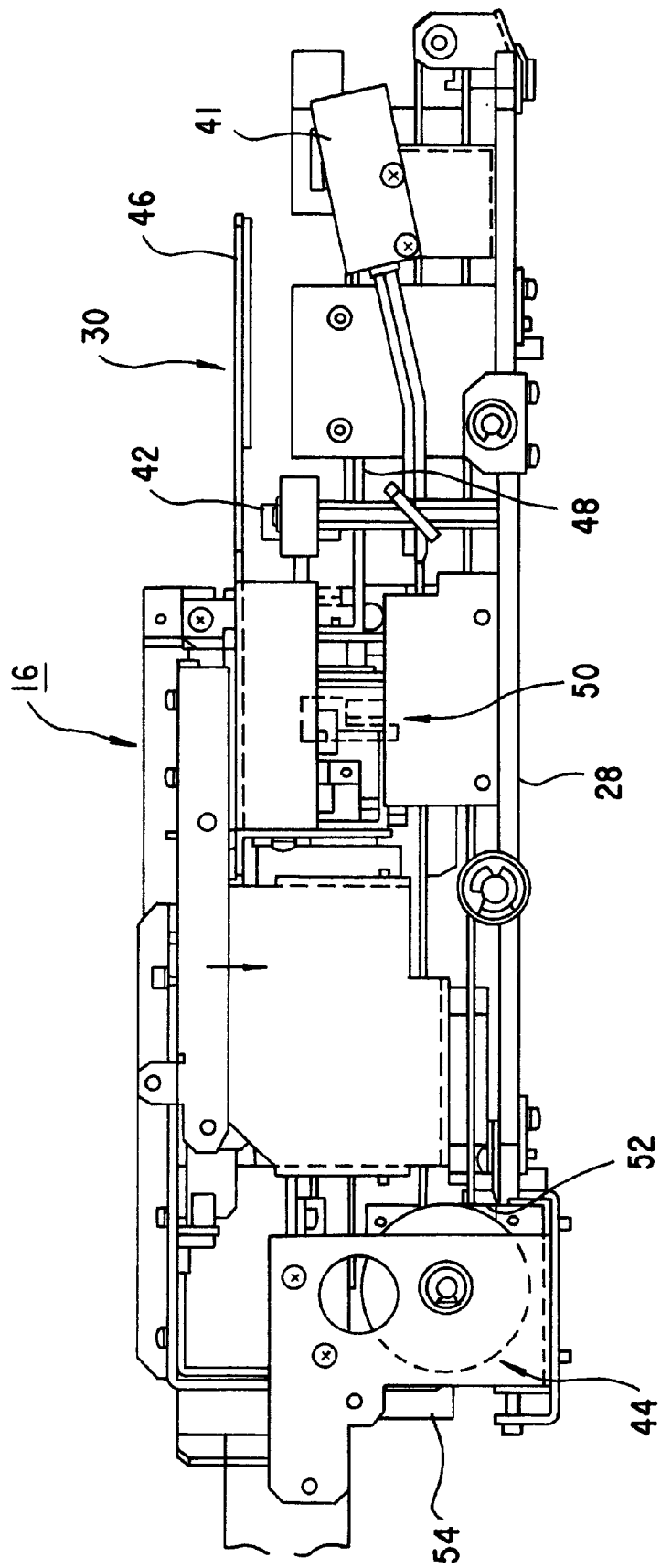
FIG. 4 is a diagram showing a side view of the hand mechanism.

FIG. 3 is a diagram showing a horizontal cross section of the accessor hand mechanism 16 (or a hand assembly) and FIG. 4 is a diagram showing a side view thereof. As shown in FIG. 4, a hand unit (picker) 30 having an upper hand 46 and a lower hand 48 is mounted on a base 28 movably in the forward and backward directions between front and rear positions. At the rear end of the base 28, a motor 32 for moving the hand unit 30 is mounted. A timing belt 36 is wound around a pulley linked to the output shaft of the motor 32 and a pulley 34 rotatably attached to the front end of the base 28. It should be noted that the pulley connected to the output shaft of the motor 32 is not shown in the figure. The timing belt 36 is linked to the hand unit 30. The motor 32 also generates a predetermined number of tachometer pulses in each rotation thereof as well.

When the motor 32 is rotating, the driving force of the motor 32 is transmitted to the hand unit 30 by way of the timing belt 36, sliding the hand unit 30 between front and rear positions along a guide rail 38 fixed on the base 28. Beside the front end of the base 28, a flag sensor 41 for sensing reference and relative-position flags and a medium distinguishing sensor 40 for distinguishing an ordinary recording-medium cartridge from a cleaning recording-medium cartridge are provided. Reference numeral 42 is a recording-medium cartridge pressing-in mechanism for pressing a recording-medium cartridge into a cell of a cell drum or the drive unit 12.

As shown in FIG. 4, at the rear end of the base 28, a slide lock mechanism is provided for automatically preventing the hand unit 30 from sliding at the time the power of the motor 32 is turned off. The slide lock mechanism 44 comprises a ratchet wheel 52 fixed to the output shaft of the motor 32 and a ratchet 54. As roughly shown in FIG. 4, a hand opening/closing mechanism 50 is provided in the middle of the base 28 for driving the lower hand 48 in a direction approaching the upper hand 46 and in a direction departing from the upper hand 46.

Figure 5:
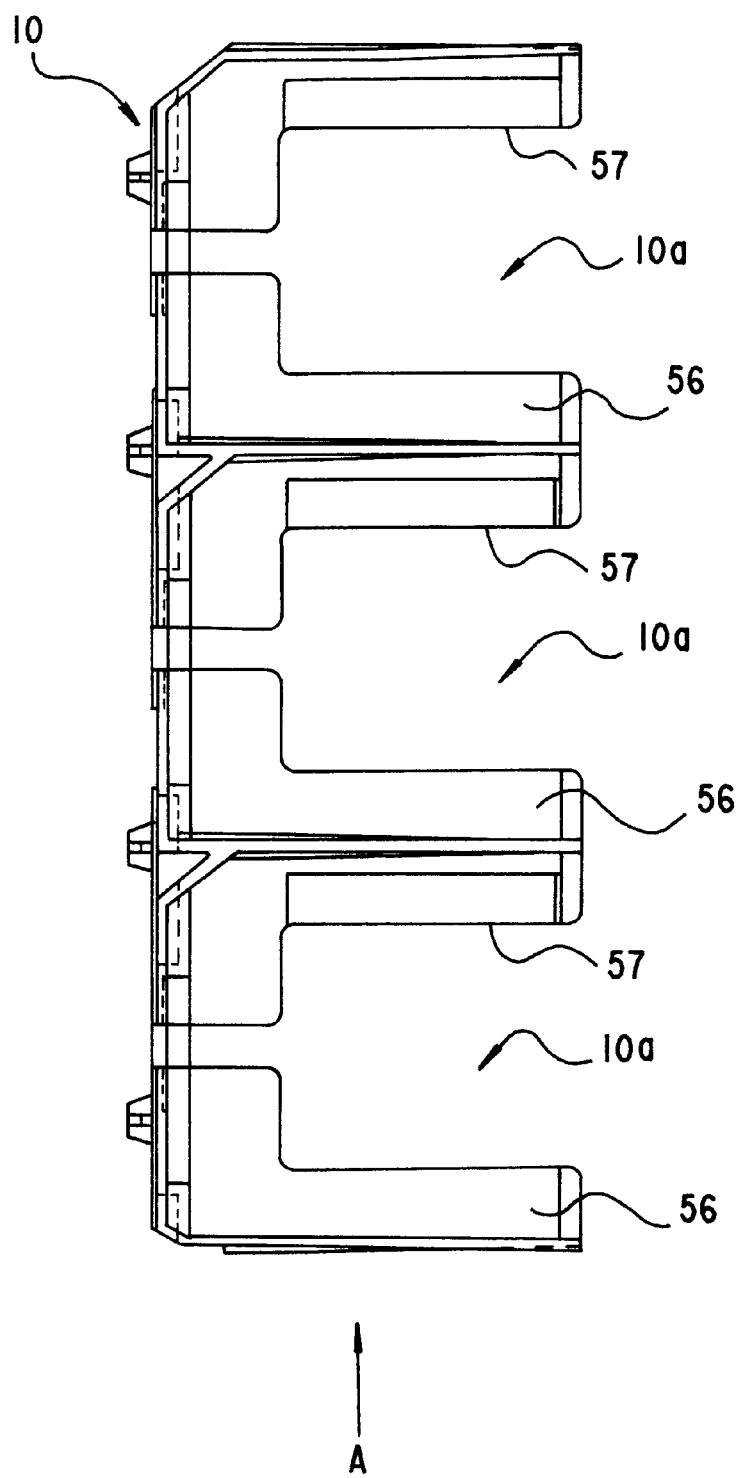
FIG. 5 is a diagram showing a horizontal cross section of one segment of a cell drum employed in the recording-medium library apparatus shown in FIG. 1.
Figure 6:
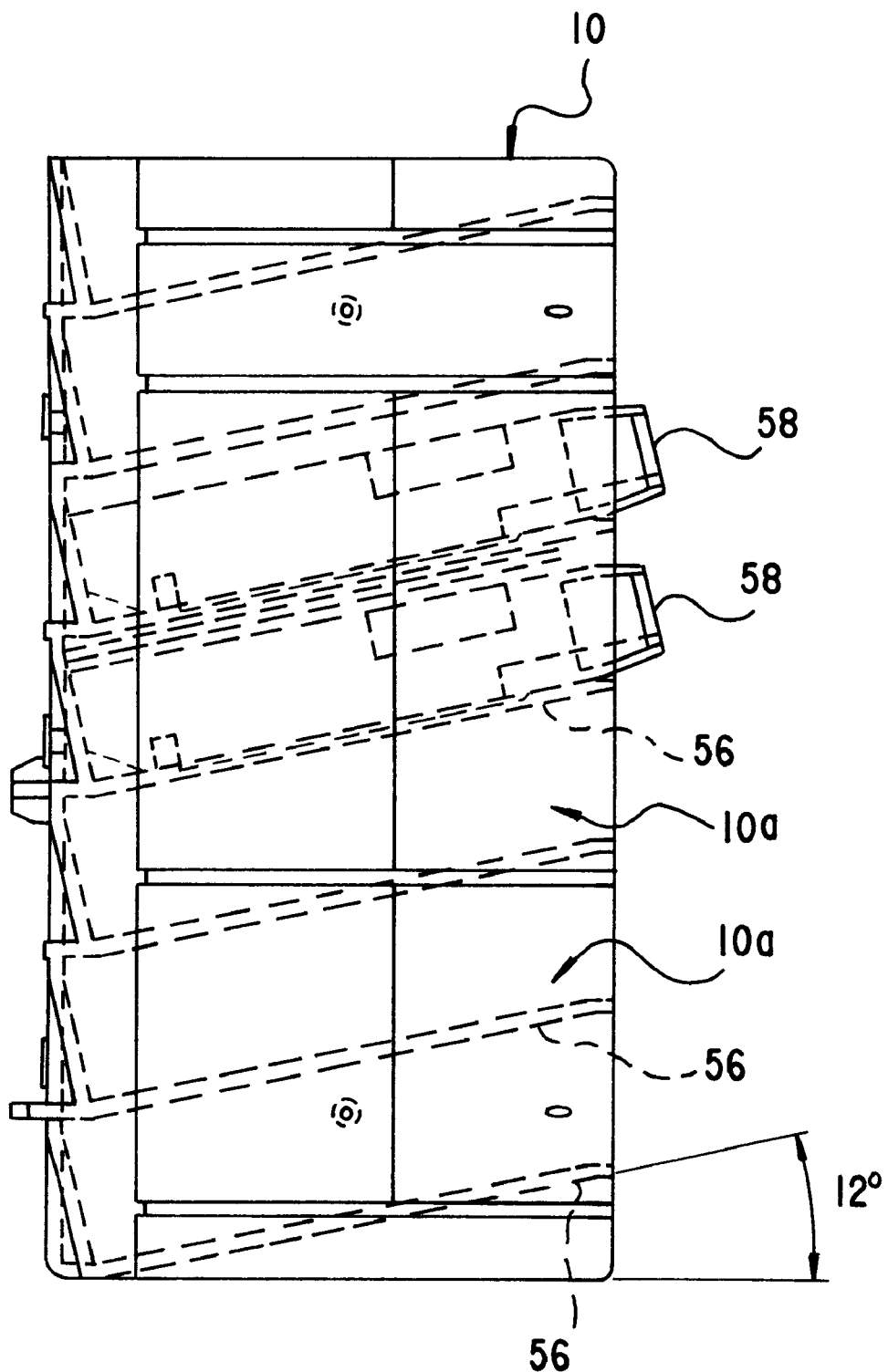
FIG. 6 is a diagram showing the segment seen through a direction indicated by an arrow A shown in FIG. 5.

FIG. 5 is a diagram showing a horizontal cross section of one segment of a cell drum 10 employed in the recording-medium library apparatus shown in FIG. 1 and FIG. 6 is a diagram showing the segment seen through a direction indicated by an arrow A shown in FIG. 5. As shown in FIG. 5, each stage of the segment comprises three cells 10a. As shown in FIG. 6, the bottom 56 of each of the cells 10a is inclined to form an angle of 12 degrees with a horizontal plane and a large cut 57 is formed at the center of the bottom 56.

Since the bottom 56 of each of the cells 10a is inclined to form an angle of 12 degrees with a horizontal plane, a recording-medium cartridge 58 inserted in the cell 10a is prevented from protruding out off the front end of the cell 10a. It should be noted that the arrangement pitch in the height direction of the cell 10a, that is, in a direction in which the recording-medium cartridges are piled up, is set at a value smaller than that of the conventional recording-medium library apparatus, increasing the number of accommodatable recording-medium cartridges.

Figure 7:
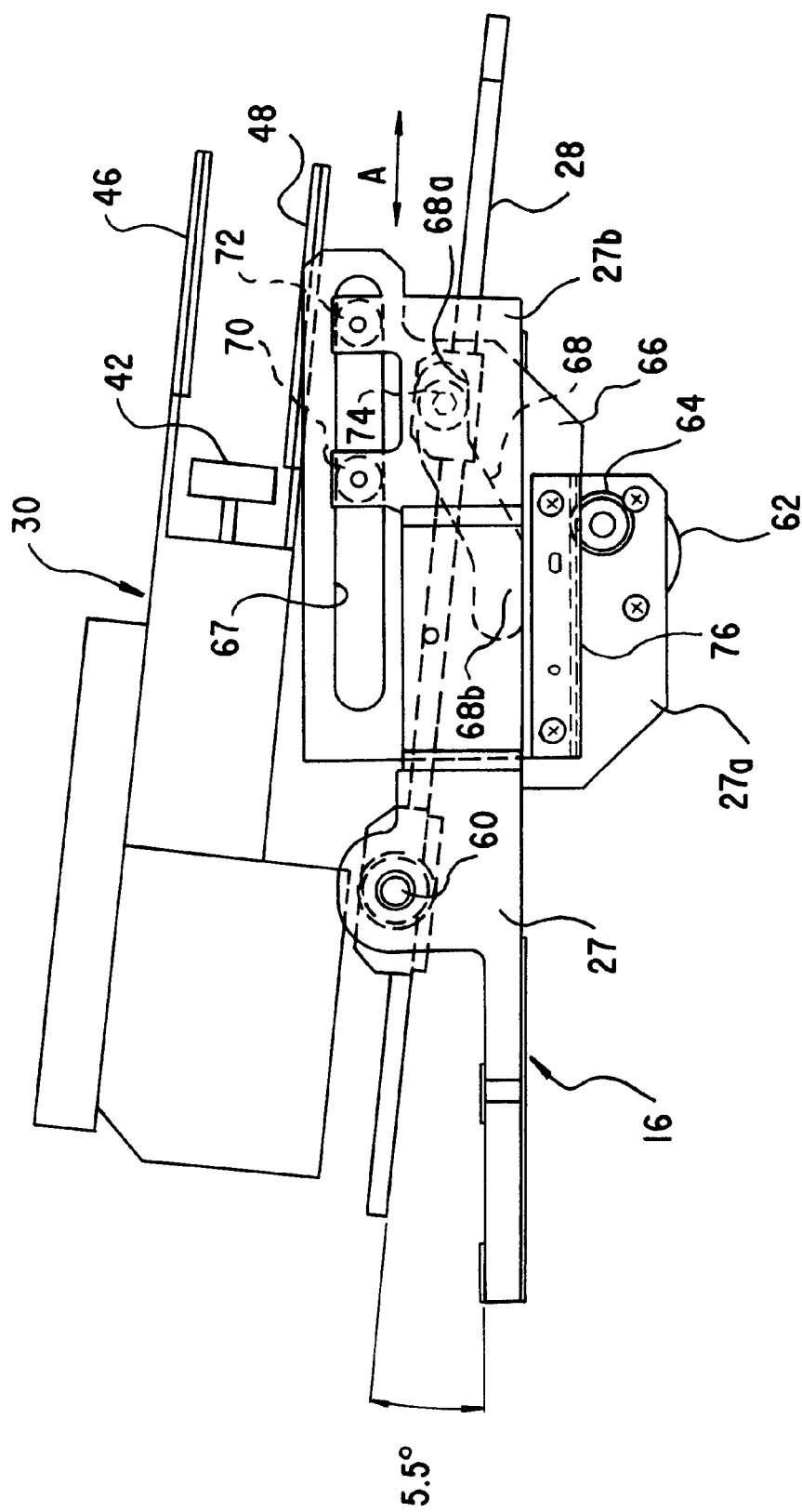
FIG. 7 is a diagram showing a side view of a tilt mechanism at a tilt angle of 5.5 degrees.
Figure 8:
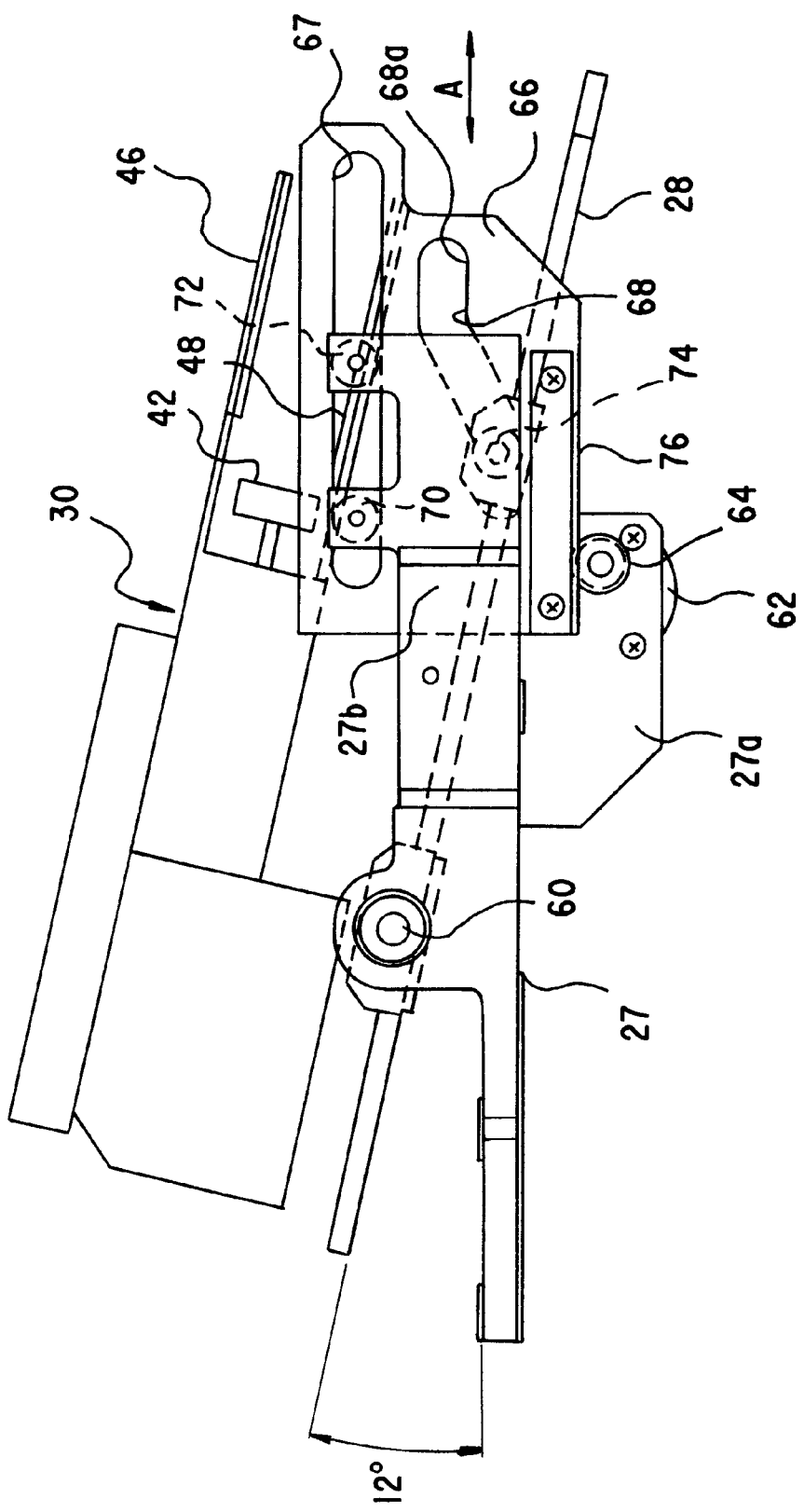
FIG. 8 is a diagram showing a side view of the tilt mechanism at a tilt angle of 12 degrees.

Next, a tilt mechanism for tilting the base 28 of the accessor hand mechanism 16 by a predetermined angle of inclination with respect to a horizontal plane is explained by referring to FIGS. 7 and 8. As described above, the bottom 56 of each of the cells 10a of the cell drum 10 is inclined to form an angle of 12 degrees with a horizontal plane so that a recording-medium cartridge 58 inserted in the cell 10a is prevented from protruding out off the front end of the cell 10a as shown in FIG. 6. Likewise, a recording-medium cartridge enter slot of the drive unit 12 has a down slope inclined from the front end to the interior end by an angle of 5.5 degrees. For this reason, in order to selectively enter a recording-medium cartridge into the drive unit 12 and the cell 10a, it is necessary to move the base 28 for mounting the hand unit 30 between first and second inclination positions which are inclined to form angles of 5.5 and 12 degrees respectively with a horizontal plane.

The base 28 for mounting the hand unit 30 is installed on a shaft 60 in such a way that the base 28 can make a rotation around the shaft 60 relative to a base 27. As shown in FIG. 2, the base 27 is in turn rotated by the motor 25 around a vertical axis line. A motor 62 is attached to a bracket 27a of the base 27 and a pinion 64 is fixed on the output shaft of the motor 62. Reference numeral 66 is a plate cam having a horizontal groove 67 and an inclined groove 68. The plate cam 66 is installed on the base 27 in such away that it can move back and forth in a horizontal direction indicated by an arrow A along a guide which is not shown in the figure. The inclined groove 68 comprises an upper horizontal portion 68a and a lower horizontal portion 68b. On the lower portion of the plate cam 66, a rack 76 engaged with the pinion 64 is formed.

At the end of another bracket 27b formed as part of the base 27, rollers 70 and 72 which can rotate to roll along the horizontal groove 67 of the plate cam 66 are provided. On the other hand, a roller 74 which can rotate to roll along the inclined groove 68 is provided on the base 28. FIG. 7 is a diagram showing an inclination state of the base 28 to form an angle of 5.5 degrees with the base 27. In this state, the hand unit 30 enters a recording-medium cartridge held by the upper and lower hands 46 and 48 into the drive unit 12.

If the motor 62 is operated in this state, the pinion 64 fixed on the output shaft of the motor 62 is rotated. Since the rack 76 is engaged with the pinion 64, the rotation of the pinion 64 causes the plate cam 66 to move in the right direction in FIG. 7. As the plate cam 66 moves in the right direction, the rollers 70 and 72 roll along the horizontal groove 67 while the roller 74 rolls along the inclined groove 68. As the plate cam 66 moves fully to a right end, the roller 74 is positioned inside the lower horizontal portion 68b of the inclined groove 68 as shown in FIG. 8, inclining the base 28 to form an angle of 12 degrees with the base 27. In this state, the hand unit 30 enters a recording-medium cartridge held by the upper and lower hands 46 and 48 into the cell 10a.

When the motor 62 is rotated in the reverse direction, on the other hand, the plate cam 66 moves in the left direction in the figure, inclining the base 28 to form an angle of 5.5 degrees with the base 27 as shown in FIG. 7. In this way, by rotating the motor 62 in the normal and reverse directions, the base 28 is rotated between the first and second inclined positions which form angles of 5.5 and 12 degrees respectively with the base 27.

Figure 9:
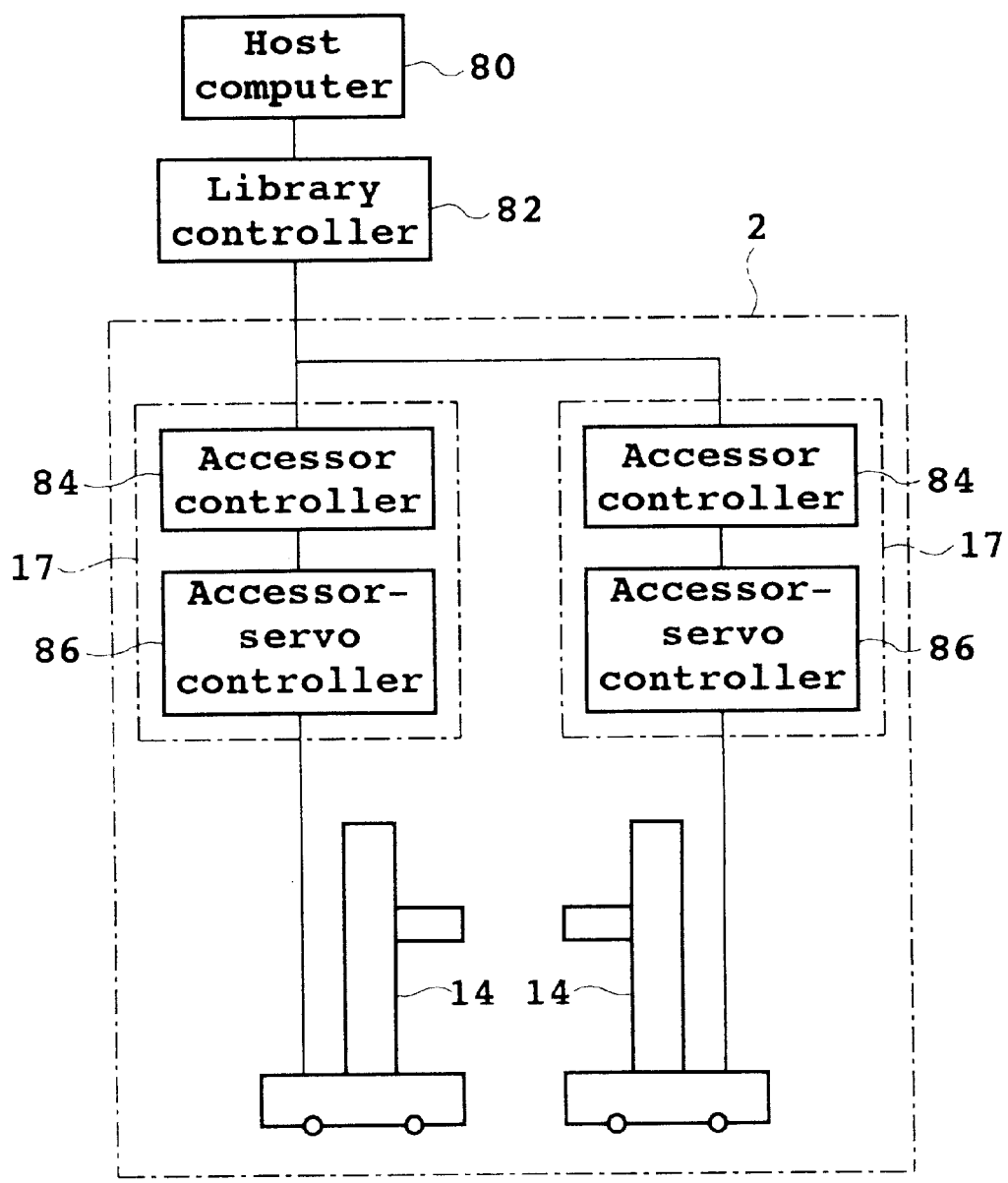
FIG. 9 is a block diagram showing a control system.

FIG. 9 is a block diagram showing a control system of the recording-medium library apparatus 2. The recording-medium library apparatus 2 is connected to a host computer 80 through a library controller 82 for carrying out general control of the recording-medium library apparatus 2. As described earlier, each of the accessor controller units 17 comprises an accessor controller 84 and an assessor-servo controller 86.

The accessor controller 84 communicates with the host computer 80 by way of the library controller 82 as well as carries out processing control based on signals input from a variety of sensors and switches. On the other hand, the accessor servo-controller 86 performs control to drive the accessor 14, the cell drum 12 and the recording-medium cartridge access station 5.

Figure 10:
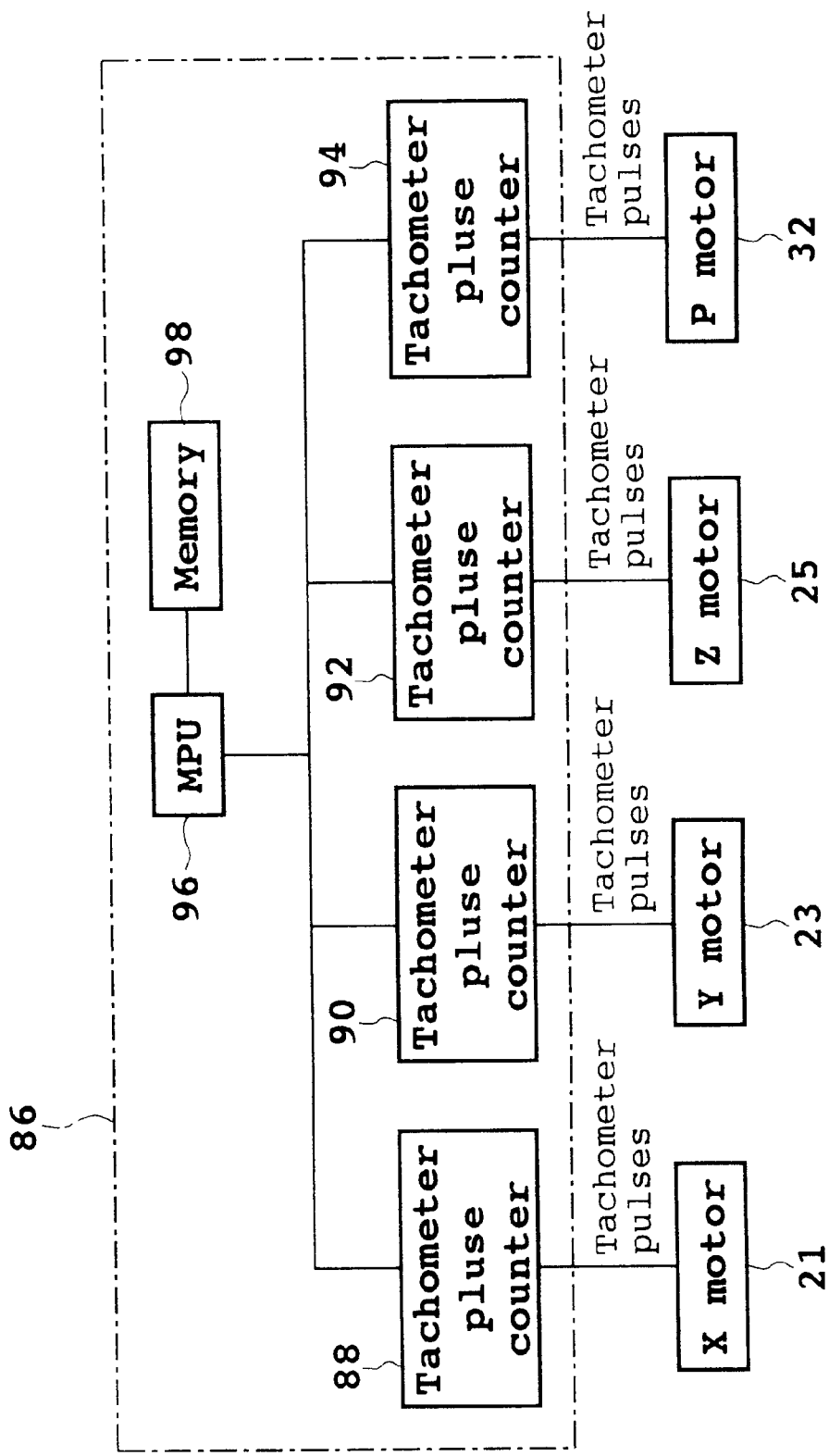
FIG. 10 is a block diagram showing a tachometer-pulse measuring system.

FIG. 10 is a block diagram showing a tachometer-pulse measuring system. As shown in the figure, the X motor 21, the Y motor 23, the Z motor 25 and the picker motor (a hand-unit motor) 32 are connected to tachometer-pulse counters 88, 90, 92 and 94 respectively. The tachometer-pulse counters 88, 90, 92 and 94 are connected to an MPU 96 employed in the accessor-servo controller 86. The accessor-servo controller 86 also includes a memory unit 98 connected to the MPU 96. Tachometer pulses generated by the X motor 21, the Y motor 23, the Z motor 25 and the picker motor 32 are counted by the tachometer-pulse counters 88, 90, 92 and 94 respectively, and the results of the counting are stored in the memory unit 98 by the MPU 96.

Figure 11:
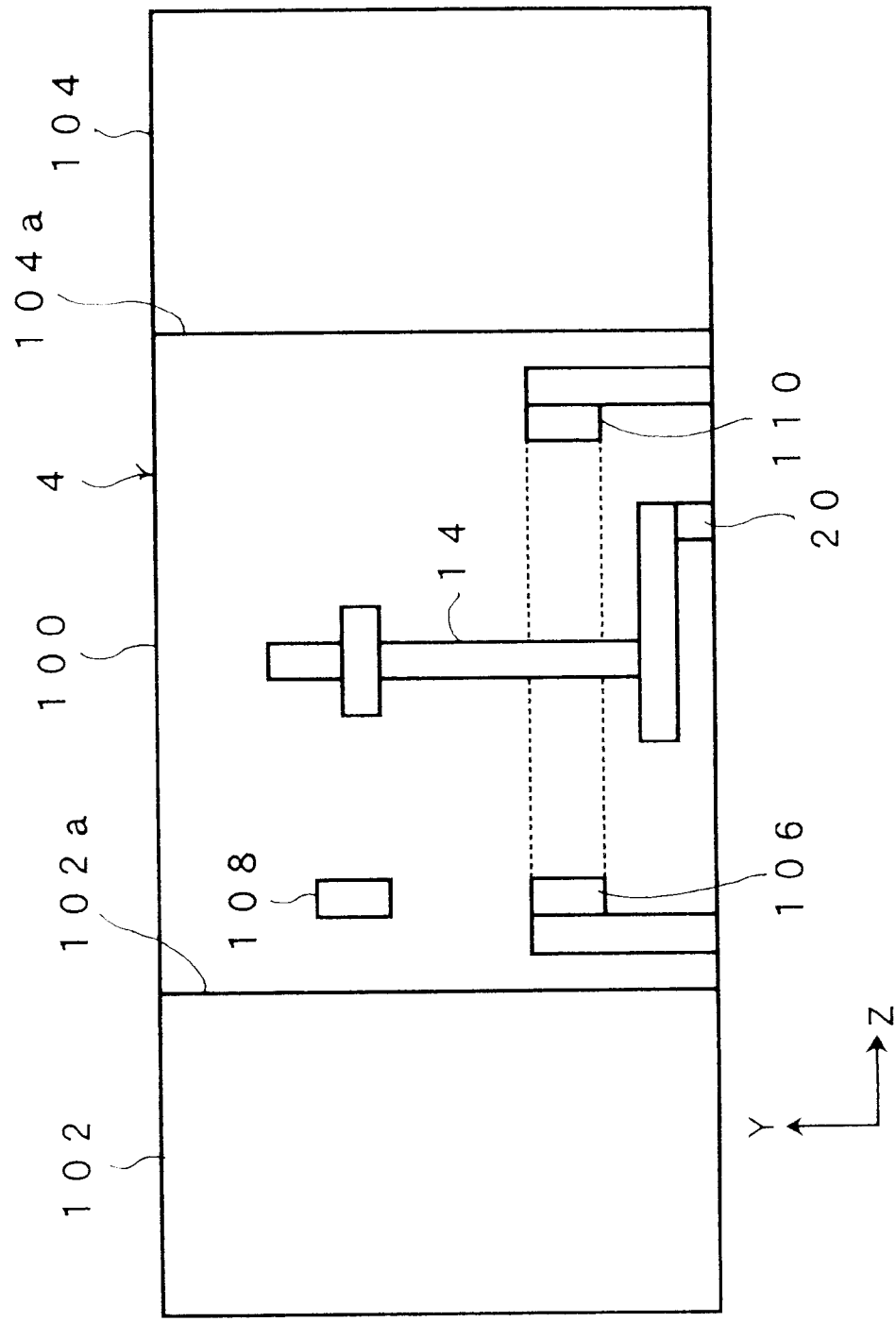
FIG. 11 is a diagram showing a side view of locations for installing reference flags.

FIG. 11 is a diagram showing a side view of locations for installing reference flags. As shown in the figure, the housing 4 of the recording-medium library apparatus 2 comprises a center frame 100, a front frame (Z1 frame) 102 and a rear frame (Z0 frame) 104. In the following description, a junction surface 102a between the center frame 100 and the Z1 frame 102 is referred to as a Z1 surface whereas a junction surface 104a between the center frame 100 and the Z0 frame 104 is referred to as a Z0 surface.

Figure 12:
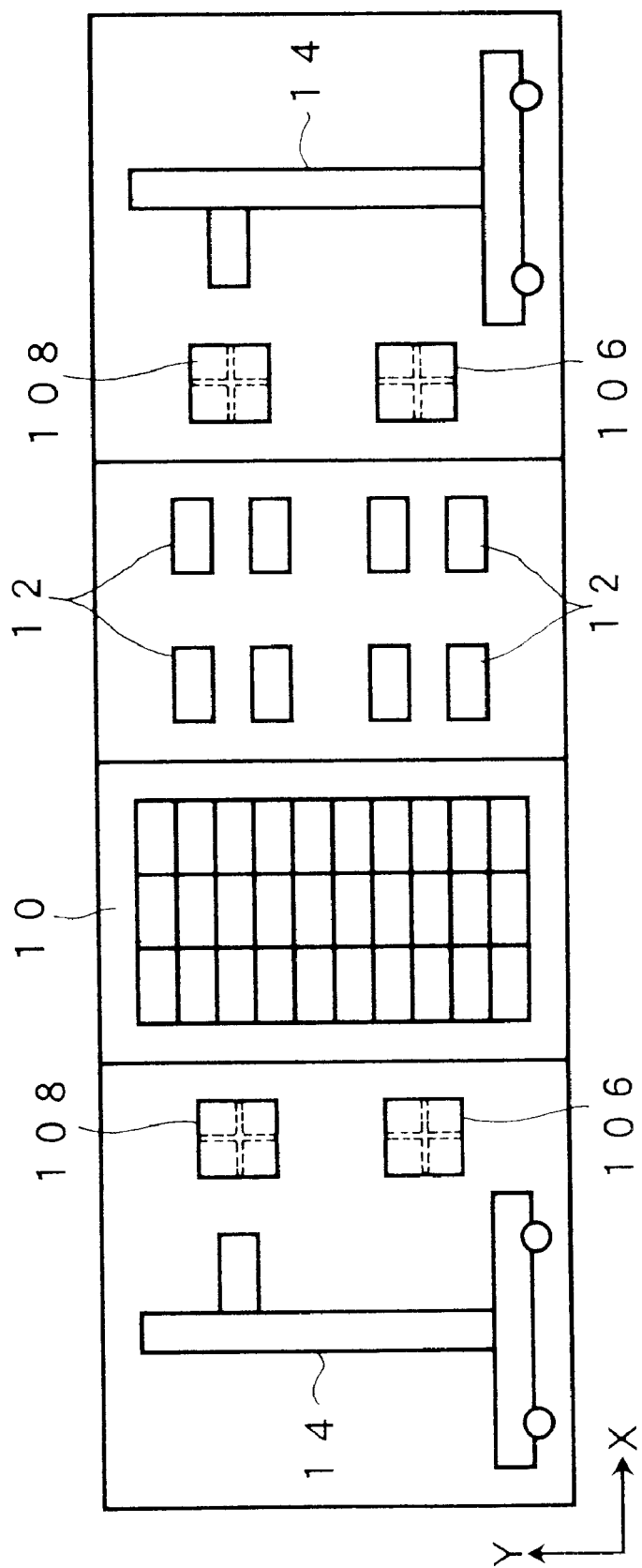
FIG. 12 is a diagram showing a front view of the locations for installing the reference flags.

On the front lower portion of the center frame 100, a first reference flag 106 is provided. The first reference flag 106 is installed in the housing 4 at a mechanical precision within an allowable range. Above the first reference flag 106, a second reference flag 108 is provided. On the rear lower portion of the center frame 100, a third reference flag 110 is provided. The first and third flags 106 and 110 are installed at such locations that a straight line connecting the first and third flags 106 and 110 is perpendicular to the X rail 20. FIG. 12 is a diagram showing a front view of the locations for installing the reference flags 106 to 110. The three reference flags 106, 108 and 110 are provided for each accessor 14. As shown in the figure, the third reference flag 110 is under the shadow of the first reference flag 106 and, thus, not visible.

Figure 13:
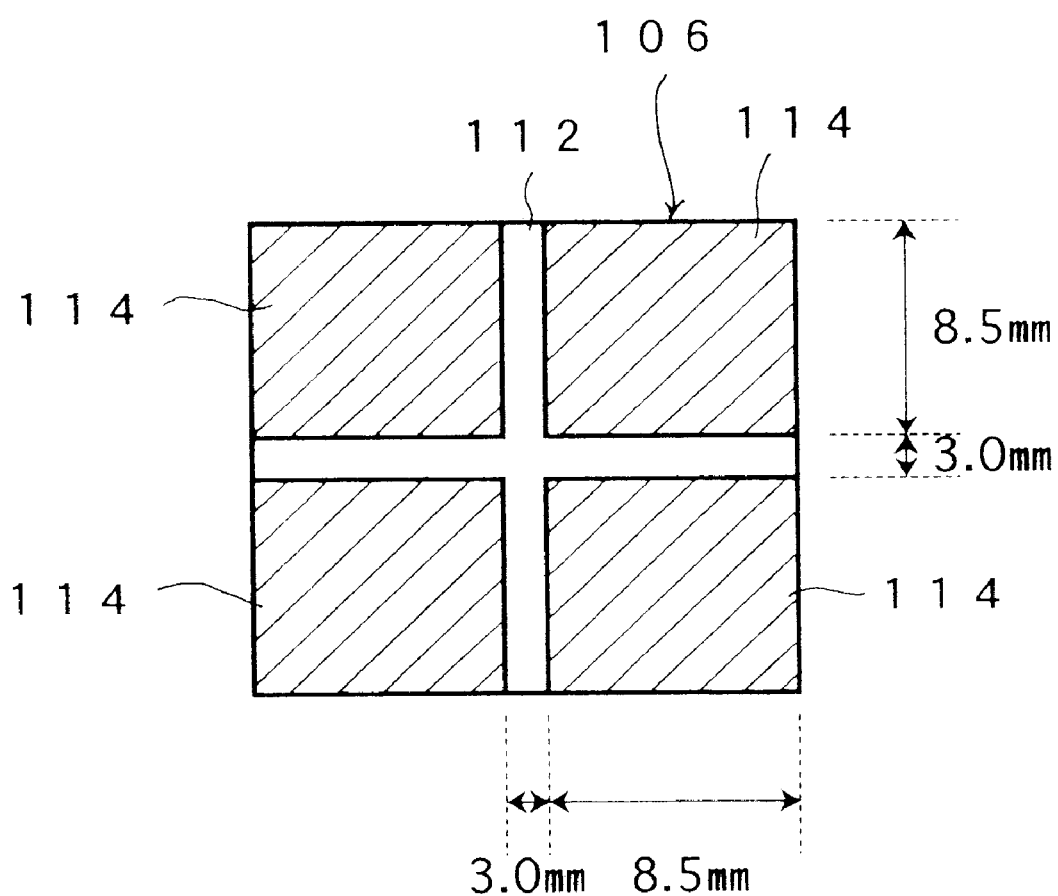
FIG. 13 is a diagram showing a front view of a reference flag.

FIG. 13 is a diagram showing a front view of the first reference flag 106. As shown in the figure, the first reference flag 106 has a square shape and comprises a reflective surface with a crossed shape 112 and a non-reflective surface 114 occupying the remaining area thereof. The non-reflective surface 114 is divided by the crossed-shape reflective surface 112 into four segments. Each of the reflective-surface segment has a square shape with a side of 8.5 mm. The width of each of the crossing lines constituting the crossed-shape reflective surface 112 is 3.0 mm. The second and third reference flags 108 and 110 each have the same configuration as the first reference flag 106.

Figure 14:
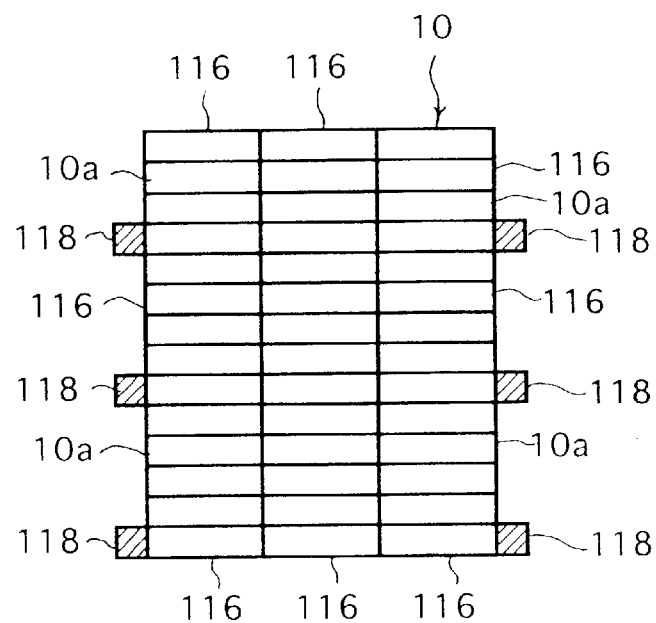
FIG. 14 is a diagram showing a state of installation of relative-position flags in a cell drum.

FIG. 14 is a skeleton diagram showing a state of installation of relative-position flags in the cell drum 10. The cross section of the cell drum 10 is a heptagon. FIG. 14 is a diagram showing a cell segment, one surface of the cell drum 10. As shown in the figure, each cell segment comprises a plurality of cell blocks 116 joined to each other. A cell block 116 comprises typically five cells 10a.

Figure 15:
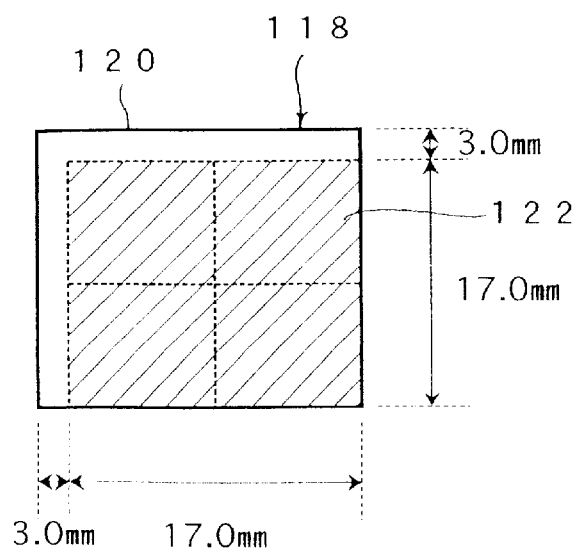
FIG. 15 is a diagram showing a front view of the relative-position flag.

The cell blocks 116 on both sides of the cell segment each have a relative-position flag 118 installed thereon, but none of the cell blocks 116 on the center portion have one. FIG. 15 is a diagram showing a front view of the relative-position flag 118. As shown in FIG. 15, each relative-position flag 118 has a square shape with a side of 20 mm. The relative-position flag 118 comprises a reflective surface 120 at edges along two of the sides of the square and a non-reflective 122 on the remaining square area with a side of 17 mm. The reflective surface 120 comprises two portions forming a rectangle. The width of each of the two portions is 3.0 mm.

Next, the relative-position measuring system of the recording-medium library apparatus provided by the present invention using the reference flags 106, 108 and 110 and the relative-position flags 118 is explained. The relative-position measuring system provided by the present invention is used for measuring distances from the accessor 14 to a plurality of relative-position flags 118 installed on the cell drum 10.

First of all, when the accessor 14 is moved, the first to third reference flags 106, 108 and 110 are detected and the respective detected actual tachometer count values are stored in the memory unit 98. Stored in the memory unit 98 in advance are design tachometer count values for the respective first to third reference flags 106, 108 and 110 which were found from design values. By calculating the differences between the design tachometer count values and the actual tachometer count values, the gradient of the Y axis of the accessor 14 with respect to the X axis and the gradient of the Z axis of the accessor 14 with respect to the X and Y axes can be found.

Figure 26:
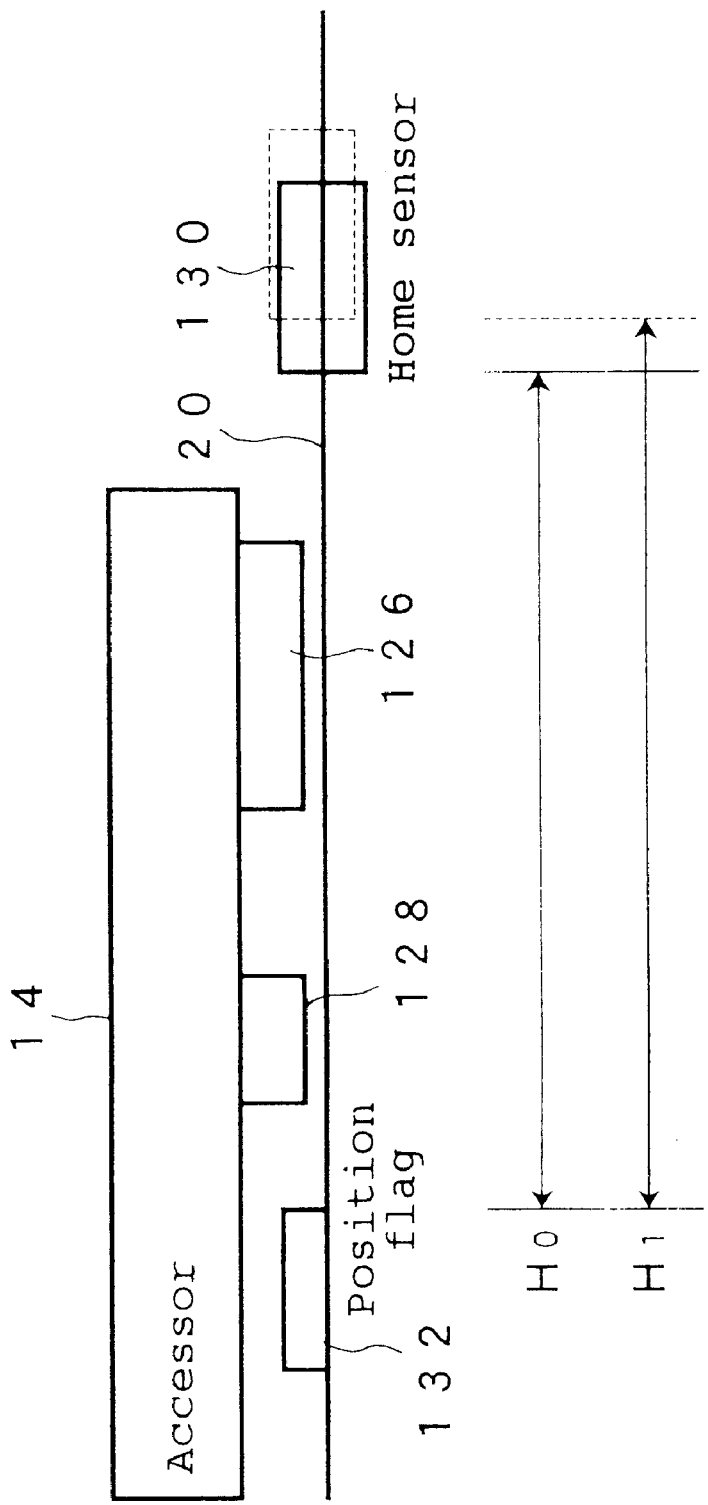
FIG. 26 is a diagram showing relations of positions of a position flag and a home sensor prior to and after replacement of the home sensor.

The Z axis of the accessor 14 is defined as a straight line connecting the start point and the end point of a rotation of the accessor hand mechanism 16 around the Y axis. Normally, the accessor hand mechanism 16 is controlled to rotate from a start point to an end point by 180 degrees. As shown in FIG. 26, an X home flag 126 and a position sensor 128 are provided for each accessor 14. On the X rail 20, an X home sensor 130 for detecting the X home flag 126 is installed.

A plurality of position flags 132 are further provided on the X rail 20 at intervals of 30 cm. When the X home sensor 130 detects the X home flag 126, the tachometer pulse counter 88 of the X motor 21 is reset or cleared. Likewise, a Y home sensor not shown in the figure is provided on the Y column 18 and a Y home flag also not shown in the figure is installed on the support base 24 of the accessor hand mechanism 16. When the Y home sensor detects the Y home flag, the tachometer pulse counter 90 of the Y motor 23 is reset or cleared.

Furthermore, a Z home flag also not shown in the figure is provided on the accessor hand mechanism 16 and a Z home sensor also not shown in the figure is installed on the support base 24 of the accessor hand mechanism 16. When the Z home sensor detects the Z home flag, the tachometer pulse counter 92 of the Z motor 25 is reset or cleared. Similarly, a slide home sensor also not shown in the figure is provided on the support base 28 of the accessor hand mechanism 16 and a slide home flag also not shown in the figure is installed on a hand unit (picker) 30. When the slide home sensor detects the slide home flag, the tachometer pulse counter 94 of the hand-unit (picker) motor 32 is reset or cleared.

As described above, FIG. 14 is a diagram showing a state of installation of the relative-position flags in the cell drum 10. Each of the relative-position flags 118 has design tachometer count values in the X, Y and Z directions with the positions of the X, Y and Z home sensors each taken as a reference. These design tachometer count values are stored in the memory unit 98 in advance.

The relative-position measuring system provided by the present invention uses the gradients of the Y and Z axes of the accessor 14 for correcting the design tachometer count values of the relative-position flags 118 in order to find theoretical tachometer count values which are then stored in the memory unit 98. In the second place, tachometer count values corresponding to a location immediately before the relative-position flag 118, the position of which is to be measured, are computed from the theoretical tachometer count values stored in the memory unit 98. The tachometer count values are used to move the accessor 14 to the location.

From that location, the accessor 14 is further moved in a direction in which the flag sensor 41 passes through the relative-position flag 118. As the flag sensor 41 passes through the relative-position flag 118, arriving at the opposite side of the relative-position flag 118, the actual tachometer count value is stored in the memory unit 98. Then, a difference between the actual tachometer count value obtained from the measurement and the theoretical tachometer count value is found and stored in the memory unit 98 as a correction value of the theoretical tachometer count value. The relative-position measurement is carried out for each relative-position flag 118 and for each entire frame accommodating the cell drums 10.

In detection of the reference flag 106, first of all, the accessor 14 is moved in the X direction and the reflective surface 112 of the reference flag 106 that extends in the longitudinal direction is detected. The count value which is achieved by the tachometer pulse counter 88 at the time the longitudinal reflective surface 112 is detected is stored in the memory unit 98. Then, the accessor 14 is moved in the Y direction and the reflective surface 112 thereof that extends in the transversal direction is detected. The count value which is achieved by the tachometer pulse counter 90 at the time the transversal reflective surface 112 is detected is stored in the memory unit 98. The coordinates of the reference flag 106 are given as the count values of the tachometer pulse counters 88 and 90. Each of the relative-position flags 118 is detected by moving the accessor 14 in the X and Y directions in the same way as that of the reference flag 106 described above.

Each cell 10a of the cell drum 10 has an address. The memory unit 98 is used for storing relative-position data representing an address used for positioning the accessor 14 to a cell 10a at a target location indicated by the address of the cell 10a. A command is issued to search the memory unit 98 for the relative-position data representing the address of the target location. In this case, data resulting from addition of correction values to the theoretical tachometer count values is used, allowing the accessor 14 to be positioned at the target cell 10a with a high degree of accuracy.

For all cells 10a of a cell block 116, correction values found for the relative-position flag 118 associated with the cell block 116 are used. For all cells 10a of a cell block 116 on the center column of a cell segment shown in FIG. 14, correction values computed for the relative-position flag 118 provided on the right or left side of the cell segment for the right or left cell block 116 adjacent to the center cell block 116 are used.

Figure 16:
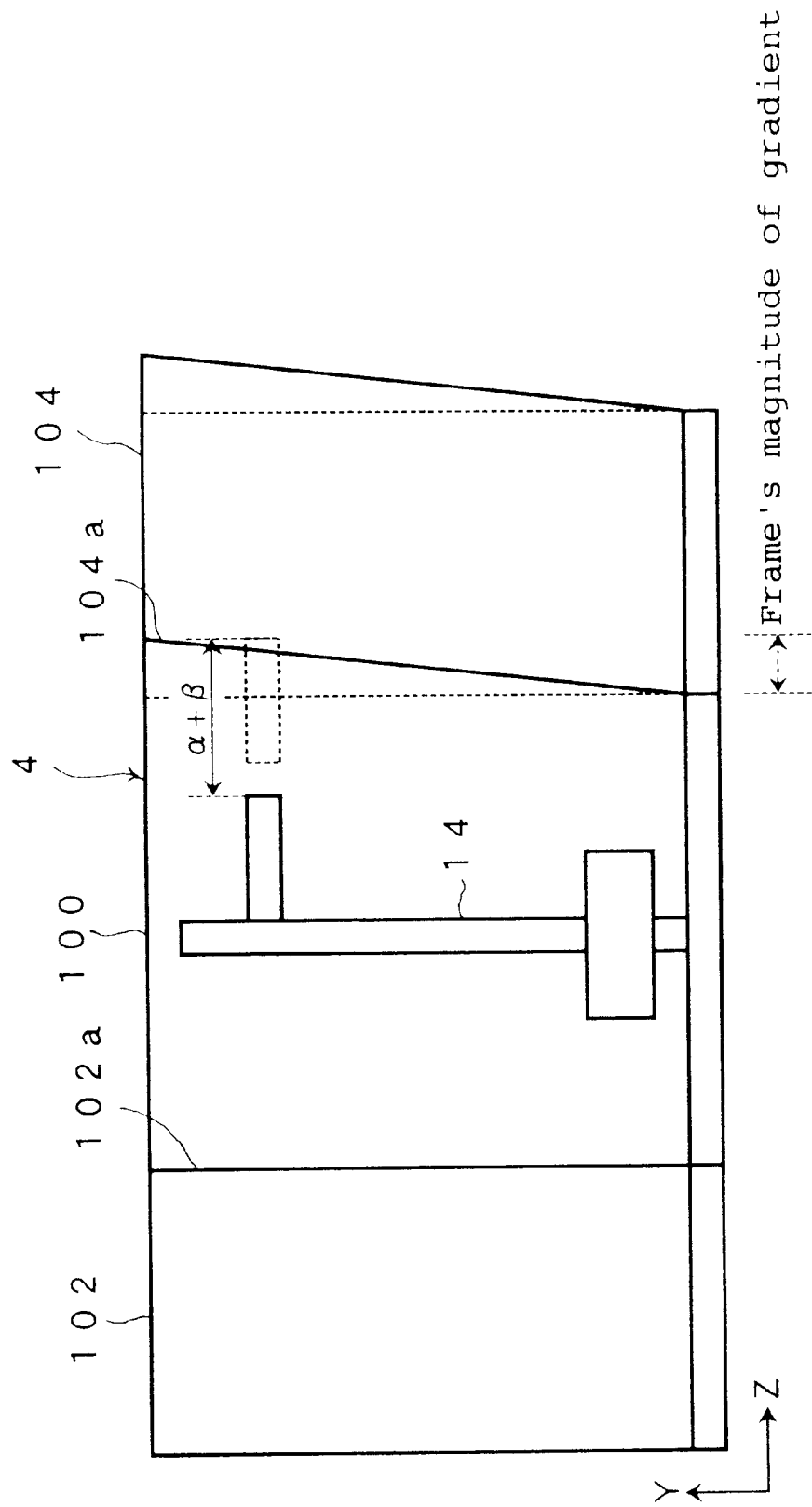
FIG. 16 is a diagram showing a side view of a state of an inclined rear frame.
Figure 17:
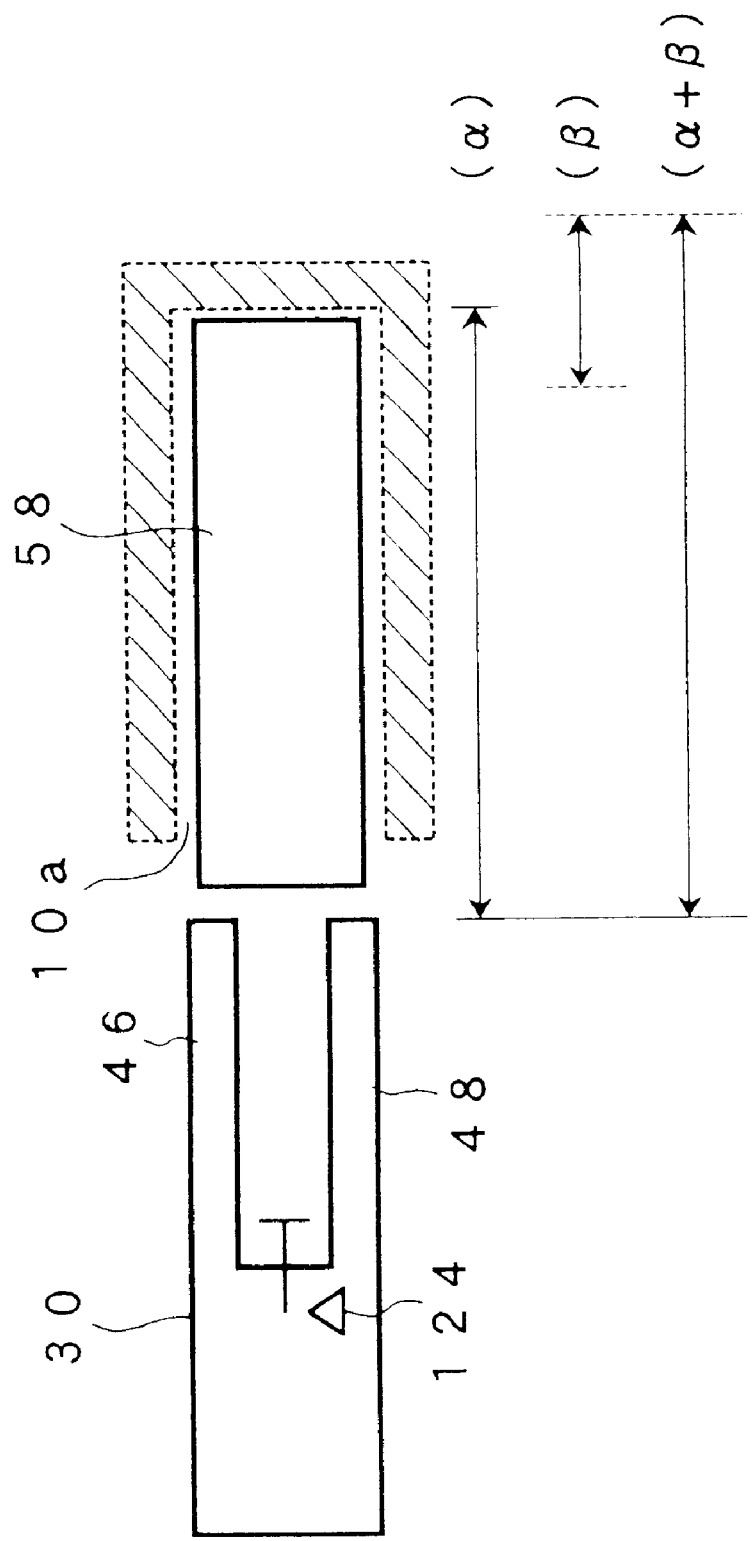
FIG. 17 is a diagram showing the magnitude of the stroke of a picker.

Next, a checking technique for a case in which only one frame was inclined at the installation time of the recording-medium library apparatus 2 is explained by referring to FIG. 16. As shown in FIG. 16, a rear frame 104 is inclined away from a center frame 100 by a predetermined angle of inclination. FIG. 17 is a diagram showing the magnitude of the stroke of the picker (hand unit) 30. As shown in the figure, a recording-medium cartridge detecting sensor 124 is provided in the picker 30. Notation $\alpha$ shown in the figure denotes a tachometer count value that provides a design stroke of the picker 30 and notation $\beta$ is a margin.

A tachometer count value equal to ($\alpha+\beta$) is delivered to the motor 32 for driving the picker 30 into a sliding operation in order to move the picker 30 in the forward direction. The sliding operation is also referred to hereafter as a select/restore operation for selecting or restoring a recording-medium cartridge. Since the rear frame 104 is inclined away from the center frame 100 by a predetermined angle of inclination as shown in FIG. 16, however, the recording-medium cartridge detecting sensor 124 is not turned on. For this reason, the picker 30 is further moved forward in order to increase the magnitude of the stroke of the picker 30 till the recording-medium cartridge detecting sensor 124 is turned on.

A tachometer count value $\gamma$ of the tachometer pulse counter 94 is then found. The tachometer count value $\gamma$ is a count value which is achieved when the picker 30 is further moved forward by flowing a current to the motor 32 to a location where the recording-medium cartridge detecting sensor 124 is turned on. The tachometer count value $\gamma$ of the tachometer pulse counter 94 is checked against a predetermined range. To be more specific, a difference DELTA between the tachometer count value $\gamma$ and the target tachometer count value ($\alpha+\beta$) is found. The difference $\delta$ is checked to find out whether or not the value thereof is equal to or smaller than $\beta$. If the difference $\delta$ is greater than $\beta$, the difference $\delta$ is displayed on a maintenance panel of the recording-medium library apparatus 2 which is not shown in the figure, requesting that the installation of the frame 104 be corrected.

Figure 18:
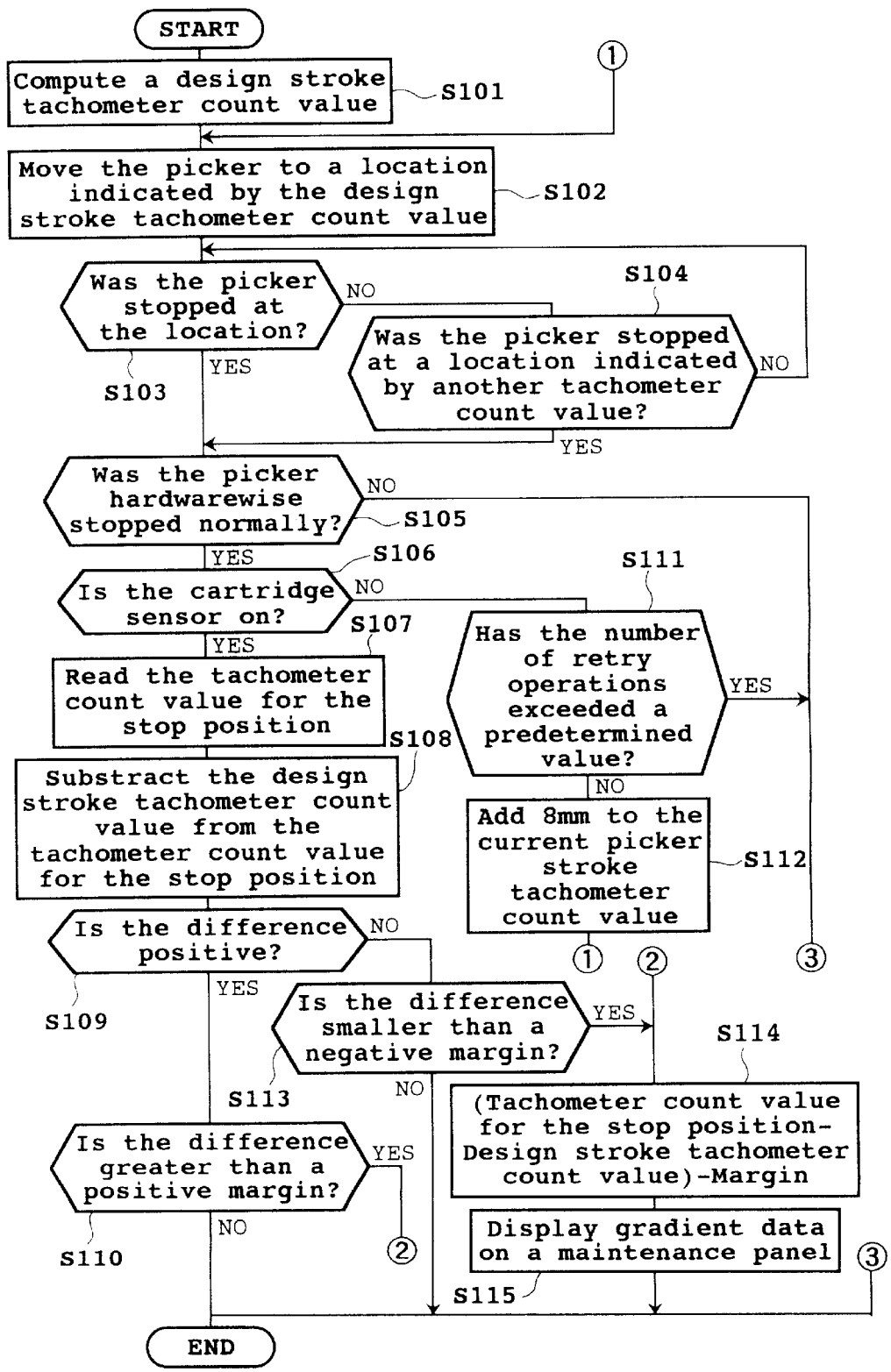
FIG. 18 is a flowchart to be followed in checking the gradient angle of a frame.

The checking technique for a case in which only one frame is inclined at the installation time of the recording-medium library apparatus 2 described above is explained in more detail by referring to a flowchart shown in FIG. 18. As shown in the figure, first of all, at a step S101 of the flowchart, a tachometer count value that specifies a design stroke is computed. The flow than goes on to a step S102 at which the picker 30 is moved to a location indicated by this tachometer count value. The flow then proceeds to a step S103 to find out whether or not the picker 30 has been stopped at the location indicated by the specified tachometer count value. If the picker 30 is found out at the step S103 to have not been stopped at the location indicated by the specified tachometer count value, the flow continues to a step S104 to find out whether the picker 30 has been stopped at a location corresponding to a tachometer count value different from the specified tachometer count value.

If the picker 30 is found stopped at either the step S103 or 104, the flow goes on to a step S105 to find out whether or not hardware wise the picker 30 has been stopped normally. If the picker 30 is found stopped abnormally at the step S105, some failures are considered to have occurred in the mechanism thereof. In this case, the checking is terminated. If the picker 30 is found stopped normally at the step S105, on the other hand, the flow proceeds to a step S106 to find out whether or not the recording-medium cartridge detecting sensor 124 is turned on. If the recording-medium cartridge detecting sensor 124 is found turned on at the step S106, the flow continues to a step S107 to read out a tachometer count value at which the picker 30 was stopped.

Subsequently, the flow goes on to a step S108 at which a design stroke tachometer count value is subtracted from the tachometer count value at which the picker 30 was stopped. The flow then proceeds to a step S109 to find out whether or not the result of the subtraction is positive data. If the result of the subtraction is found out to be positive data at the step S109, the flow continues to a step S110 to find out whether or not the result of the subtraction is greater than a positive margin. If the result of the subtraction is found smaller than or equal to the positive margin at the step S110, the magnitude of the gradient of the inclined rear frame 104 is judged to be not that big. In this case, the checking is ended.

If the recording-medium cartridge detecting sensor 124 is found turned off at the step S106, on the other hand, the flow continues to a step S111 to find out whether or not the number of retry operations has exceeded a predetermined value. If the number of retry operations is found out to have exceeded the predetermined value at the step S111, the checking is ended. If the number of retry operations is found out to have not exceeded the predetermined value at the step S111, on the other hand, the flow goes on to a step S112 at which the current stroke tachometer count value of the picker 30 is increased by 8 mm. The flow then returns to the step S102.

If the result of the subtraction found at the step S108 is found out to be negative data at the step S109, on the other hand, the flow continues to a step S113 to find out whether or not the result of the subtraction is smaller than a negative margin. If result of the subtraction is found greater than or equal to the negative margin at the step S113, the magnitude of the gradient of the inclined rear frame 104 is judged to be small. In this case, the checking is ended. A positive difference found at the step S108 indicates that the rear frame 104 is inclined to the backward direction while a negative difference indicates an inclination in the forward direction.

If the result of the subtraction found at the step S108 is found greater than the positive margin at the step S110 or found smaller than the negative margin at the step S113, on the other hand, the flow goes on to a step S114 at which the margin is subtracted from the result of the subtraction found at the step S108 to find gradient data of the rear frame 104. The flow then proceeds to a step S115 at which the gradient data is displayed on the maintenance panel of the recording-medium library apparatus 2 which is not shown in the figure as mentioned earlier to request the operator to correct the installation of the rear frame 104.

Figure 19:
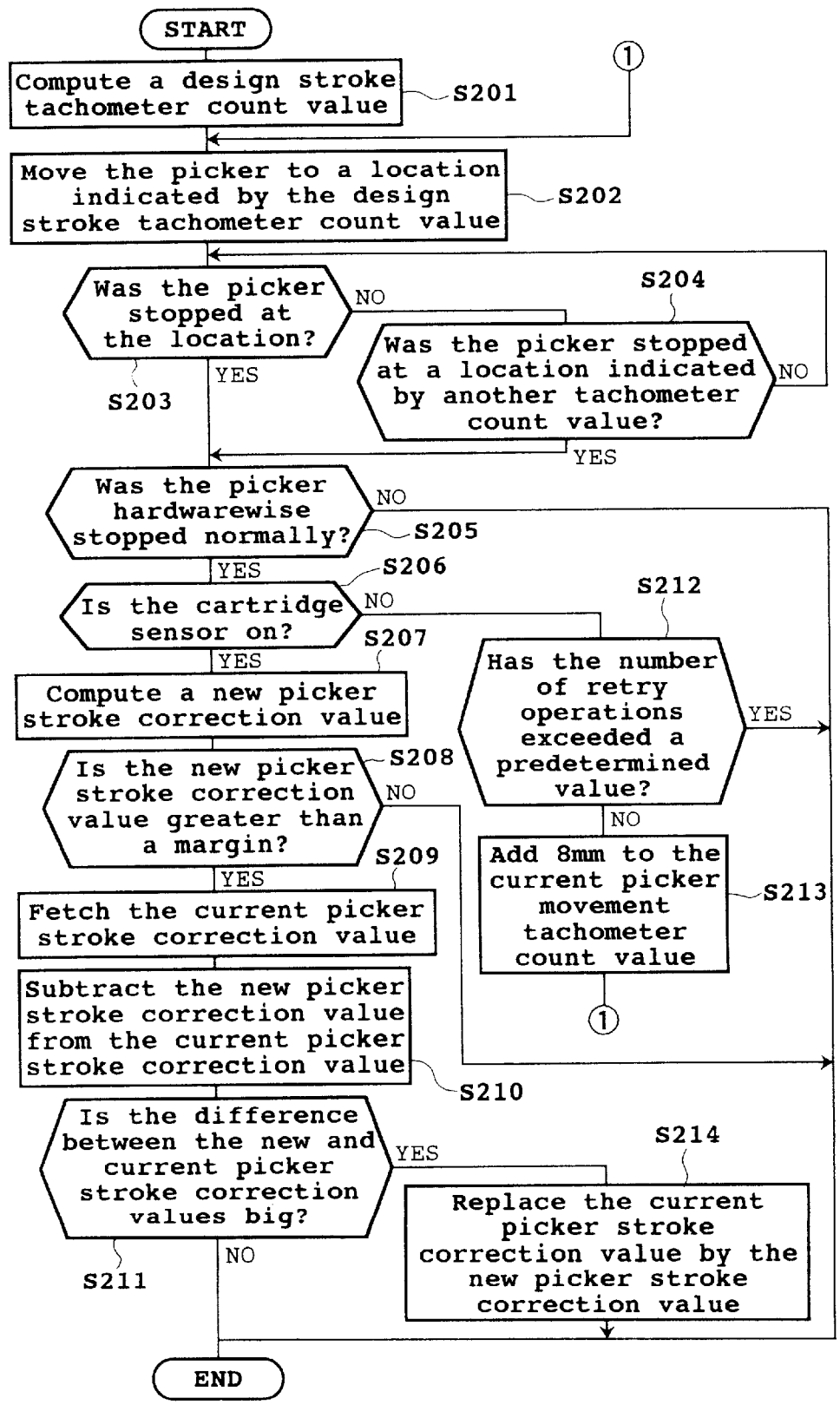
FIG. 19 is a flowchart to be followed in an operation to correct the magnitude of the stroke of the picker.

Next, operations to update a correction value for the magnitude of the stroke of the picker 30 are explained by referring to a flowchart shown in FIG. 19. First of all, as shown in the figure, at a step S201 of the flowchart, a stroke tachometer count value of the picker 30 is computed by using a correction value currently stored in the memory unit 98. The flow then goes on to a step S202 at which the picker 30 is moved to a location indicated by the computed stroke tachometer count value. Subsequently, the flow proceeds to a step S203 to find out whether or not the picker 30 has been stopped at the location indicated by the specified tachometer count value. If the picker 30 is found out at the step S203 to have not been stopped at the location indicated by the specified tachometer count value, the flow continues to a step S204 to find whether or not the picker 30 has been stopped at a location corresponding to a tachometer count value different from the specified tachometer count value.

If the picker 30 is found stopped at either the step S203 or 204, the flow goes on to a step S205 to find out whether or not hardware wise the picker 30 has been stopped normally. If the picker 30 is found stopped abnormally at the step S205, some failures are considered to have occurred in the mechanism thereof. In this case, the operations are terminated. If the picker 30 is found stopped normally at the step S205, on the other hand, the flow proceeds to a step S206 to find out whether or not the recording-medium cartridge detecting sensor 124 is turned on.

If the recording-medium cartridge detecting sensor 124 is found turned on at the step S206, the flow continues to a step S207 to compute a new correction value. The flow then goes on to a step S208 to find out whether or not the new correction value is greater than a predetermined margin. If the new correction value is found smaller than or equal to the margin at the step S208, the flow proceeds to a step S209 at which the current correction value of the picker stroke is read out from the memory unit 98. The flow then continues to a step S210 at which the difference between the new correction value and the current correction value is calculated. The flow then goes on to a step S211 to find out whether the difference found at the step S210 is big or small. If the difference is found small at the step S211, the current correction value is not updated, ending the operations.

If the recording-medium cartridge detecting sensor 124 is found turned off at the step S206, on the other hand, the flow continues to a step S212 to find out whether or not the number of retry operations has exceeded a predetermined value. If the number of retry operations is found out to have exceeded the predetermined value at the step S212, the operations are ended. If the number of retry operations is found out to have not exceeded the predetermined value at the step S212, on the other hand, the flow goes on to a step S213 at which the movement tachometer count value of the picker 30 is increased by 8 mm. The flow then returns to the step S202.

If the difference computed at the step S210 is found big at the step S211, on the other hand, the flow continues to a step S214 at which the current correction value stored at the memory unit 98 is replaced by the new correction value. The operations to update the correction value for the magnitude of the stroke of the picker are carried out for each cell block 116 and, if necessary, a new correction value δ is stored in an associated table in the memory unit 98.

In a select/restore operation of the picker 30, a picker-stroke correction value δ for a cell address used in the operation is read out from the table and added to a target movement tachometer count value α to give a movement tachometer count value (α+δ). The movement tachometer count value (α+δ) found in this way is then used in the select/restore operation of the picker 30.

Next, measures with respect to the select/restore operation of the picker 30 to counter changes in distance from the frame to the accessor 14 caused by an inclination or a shift of the frame accompanying the aging of the recording-medium library apparatus 2 are explained. In a select/restore operation of the picker 30, relative-position data measured at the installation time is compared with relative-position data computed in the operation. If the difference between them is found big, the operation is suspended. In this case, the relative-position data measured at the installation time is replaced with new one before resuming the select/restore operation.

As a result, if the select/restore operation of the picker 30 is completed normally, the relative-position data measured at the installation time is updated with the new one. If the select/restore operation of the picker 30 is completed abnormally, on the other hand, the relative-position data measured at the installation time is not updated. Instead, the abnormality is reported to an apparatus at the upper level. In this way, an inclination or a shift of the frame accompanying the aging of the recording-medium library apparatus 2 can be compensated for, allowing the time to re-measure the relative position and the like to be shortened.

Figure 20:
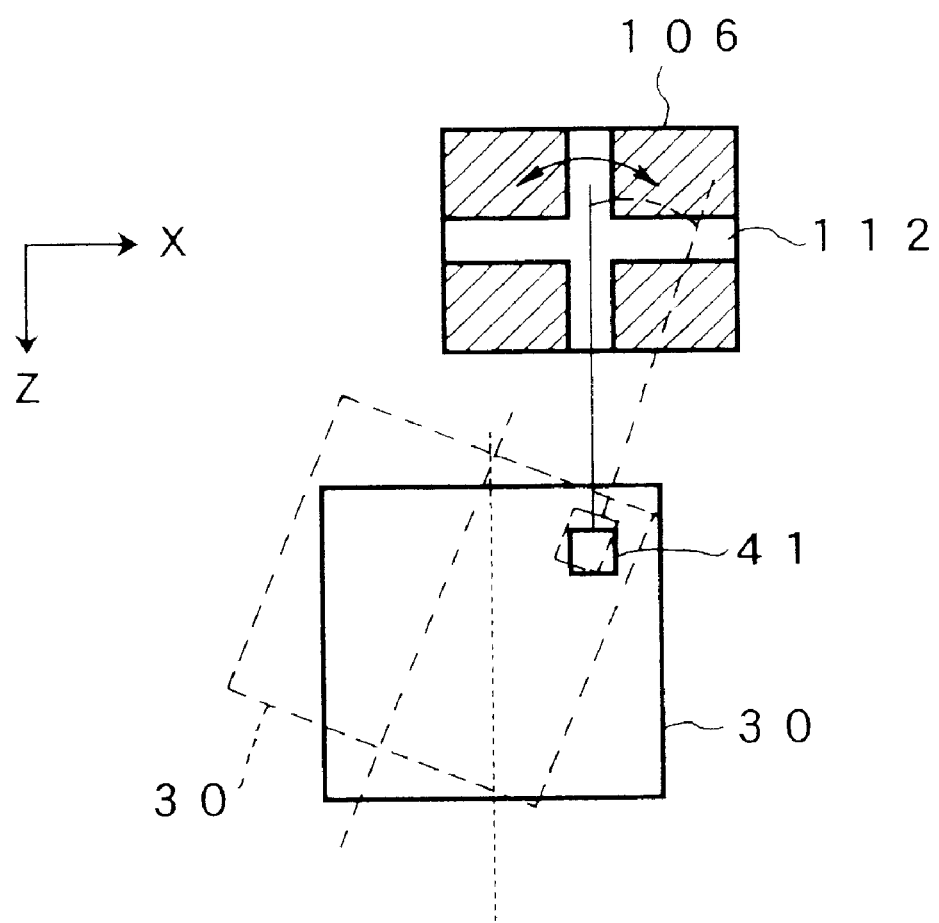
FIG. 20 is an explanatory diagram used for explaining the correction of the inclination of an Z axis with respect to an X direction by using a reference flag.

The following description explains corrective operations which are carried out when the posture of the picker 30 is inclined with respect to the reference flag 106 as shown by a dotted line in FIG. 20 due to the fact that the Z home sensor serving as a reference on the Z axis is shifted from a design location. Normally, the accessor 14 enters and receives a recording-medium cartridge 58 into or from a cell 10a with the Z axis thereof oriented perpendicularly to the X axis. With the picker 30 inclined with respect to the reference flag 106 as shown by a dotted line in FIG. 20, however, it is difficult to position the accessor 14 at a location at which the recording-medium cartridge 58 can be entered and ejected normally even if the relative position is measured.

In order to solve this problem, shifts with respect to the first reference flag 106 and the third reference flag 110 in the X and Y directions are compensated for before positioning the flag sensor 41 of the accessor 14 in front of the first or third reference flag 106 or 110. Thereafter, the Z axis is swung in the right and left directions with respect to the first or third reference flag 106 or 110 in order to find the magnitude of the shift of the Z axis with respect to the X direction. The magnitude of the shift of the Z axis with respect to the X direction is in turn used for calculating a correction value of the Z axis with respect to the X direction. With this corrective operation, since the Z axis can be oriented perpendicularly to the X direction as is the case with the picker 30 shown by a solid line in FIG. 20, the positioning margin of the picker 30 in a select/restore operation increases.

Figure 21:
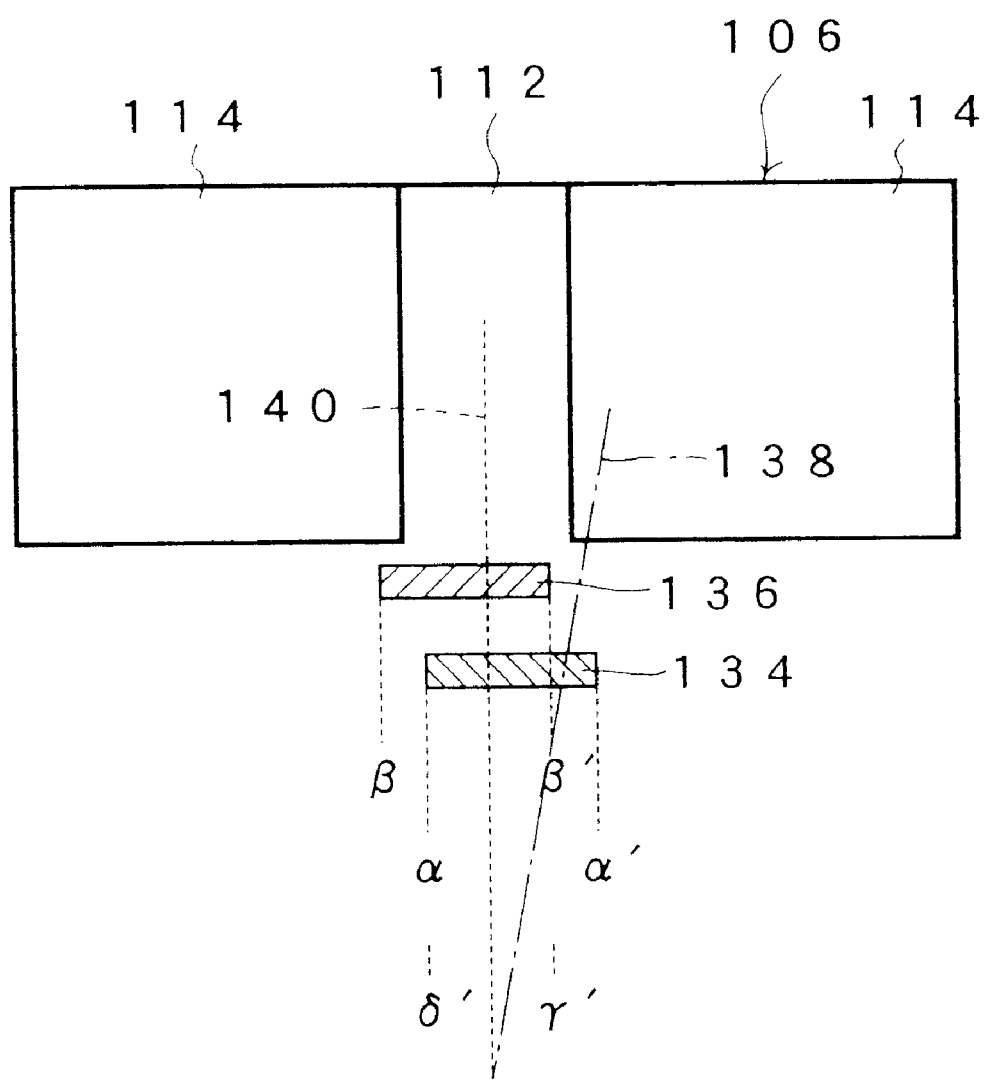
FIG. 21 is a diagram showing a relation of positions of a reactive portion of a flag sensor in computation of correction values for an Z axis with respect to an X direction.

A method for computing a correction value for the Z axis is explained by referring to FIG. 21. The Z axis is swung in the right and left directions. Let (α,α') denote measurement data which is obtained when the flag sensor 41 crosses the reflective surface 112 of the reference flag 106 from the left to the right side and (β, β') denote measurement data which is obtained when the flag sensor 41 crosses the reflective surface 112 of the reference flag 106 from the right to the left side. Reference numeral 134 is a sensor reactive portion in the measurement from the left to the right side and reference numeral 136 is the sensor reactive portion in the measurement from the right to the left side.

Center values of the measurement data are computed by using the following equations:

$$\gamma=(\alpha+\alpha')/2$$

$$\delta=(\beta+\beta')/2$$

Let X denote the magnitude of a shift caused by the reactive extension of the flag sensor 41. In this case, the center values are corrected as follows:

$\gamma'=\gamma+X$ $\delta'=\delta+X$

In this way, data including sensitivity correction values of the flag sensor 41 can be obtained. From the data inducing sensitivity correction values of the flag sensor 41, a true center values can be calculated as follows:

True center value $=(\gamma'+\delta')/2$

From the true center value, a correction value for the Z axis can be further calculated from the following equation:

Correction value=True center value−Theoretical tachometer count value

Reference numeral 138 shown in FIG. 21 is the theoretical tachometer count value and reference numeral 140 is the true center value.

Figure 22:
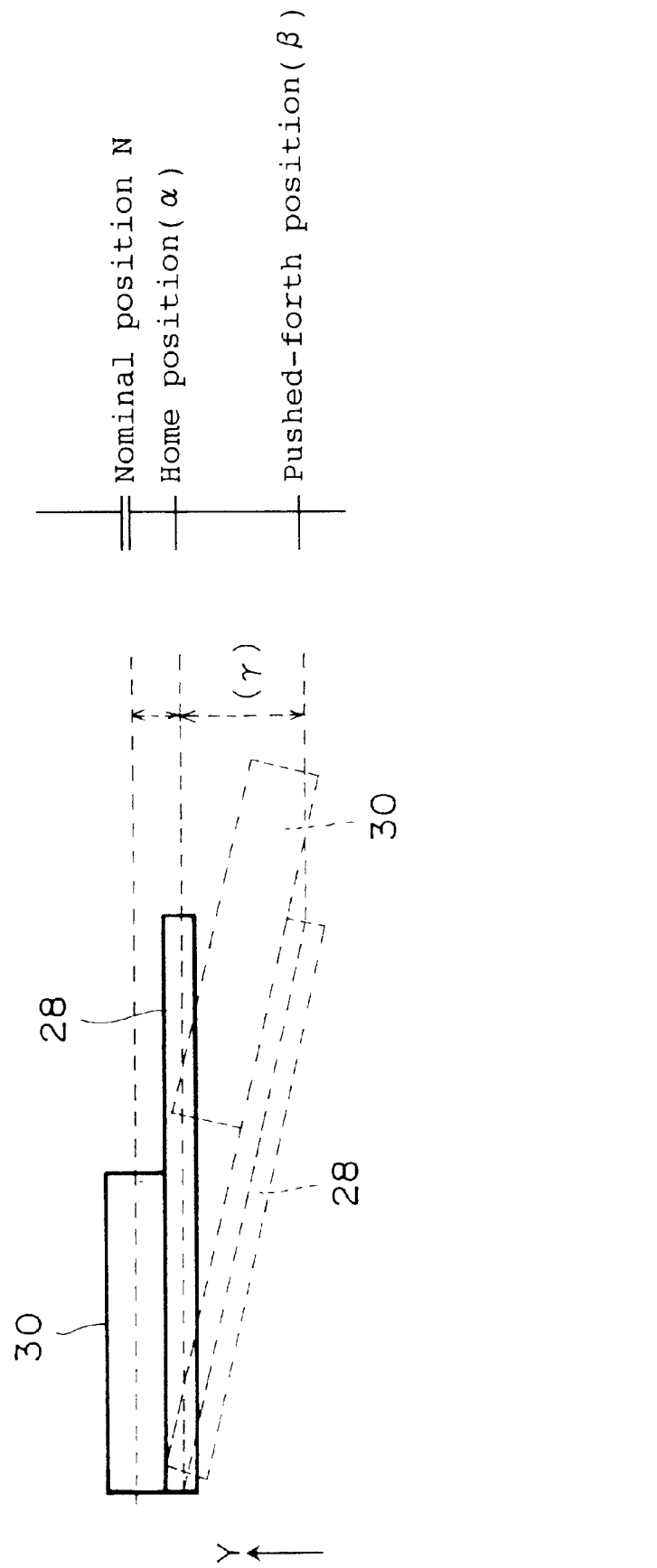
FIG. 22 is a diagram showing a gradient with respect to a Y direction resulting from a forward movement of a hand unit (that is, the picker)

Next, correction of the gradient with respect to the Y direction by a forward movement of the picker 30 is explained by referring to FIG. 22. A nominal position N shown in FIG. 22 represents the theoretical tachometer count value of the tachometer pulse counter 90 corresponding to the height of the first reference flag 106. An actual tachometer count value of the tachometer pulse counter 90 which is achieved when the position of the reference flag 106 is measured by placing the picker 30 at a home position (pulled-in position) is then found. Subsequently, difference data $\alpha$ between the actual tachometer count value and the theoretical tachometer count value is calculated and stored in the memory unit 98.

Then, the picker 30 is moved in the forward direction to a location at which the recording-medium cartridge 58 can be grasped. At this location, the position of the reference flag 106 is again measured to find a corresponding actual tachometer count value of the tachometer pulse counter 90. By the same token, difference data $\beta$ between the actual tachometer count value obtained after moving the picker in the forward direction and the theoretical tachometer count value is calculated and stored in the memory unit 98. The magnitude of the shift $\gamma$ of the picker 30 in the Y direction with the picker 30 moved forward is given by the equation $\gamma=\beta-\alpha$. In this way, the magnitude of the shift of the picker 30 in the Y direction caused by the weight and the forward movement of the picker 30 can be compensated for, allowing the positioning accuracy of the relative position to be increased.

Figure 23:
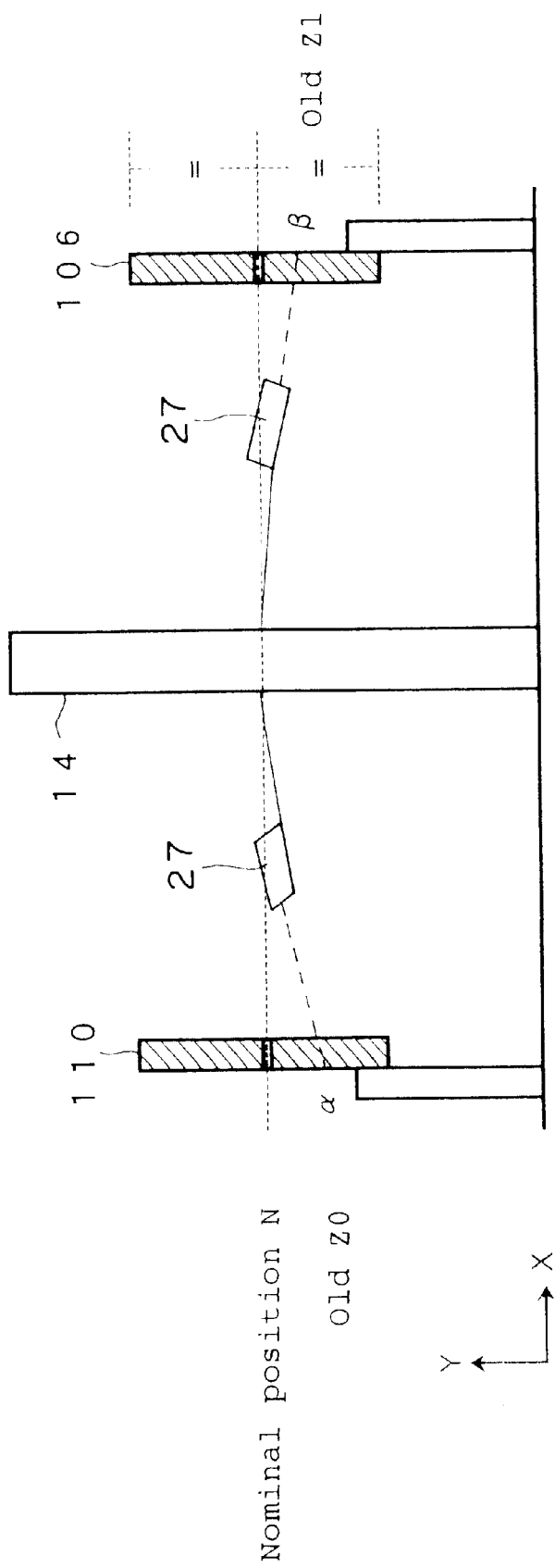
FIG. 23 is a diagram showing a relation between the positions of a rotation base and reference flags prior to replacement of an accessor.
Figure 24:
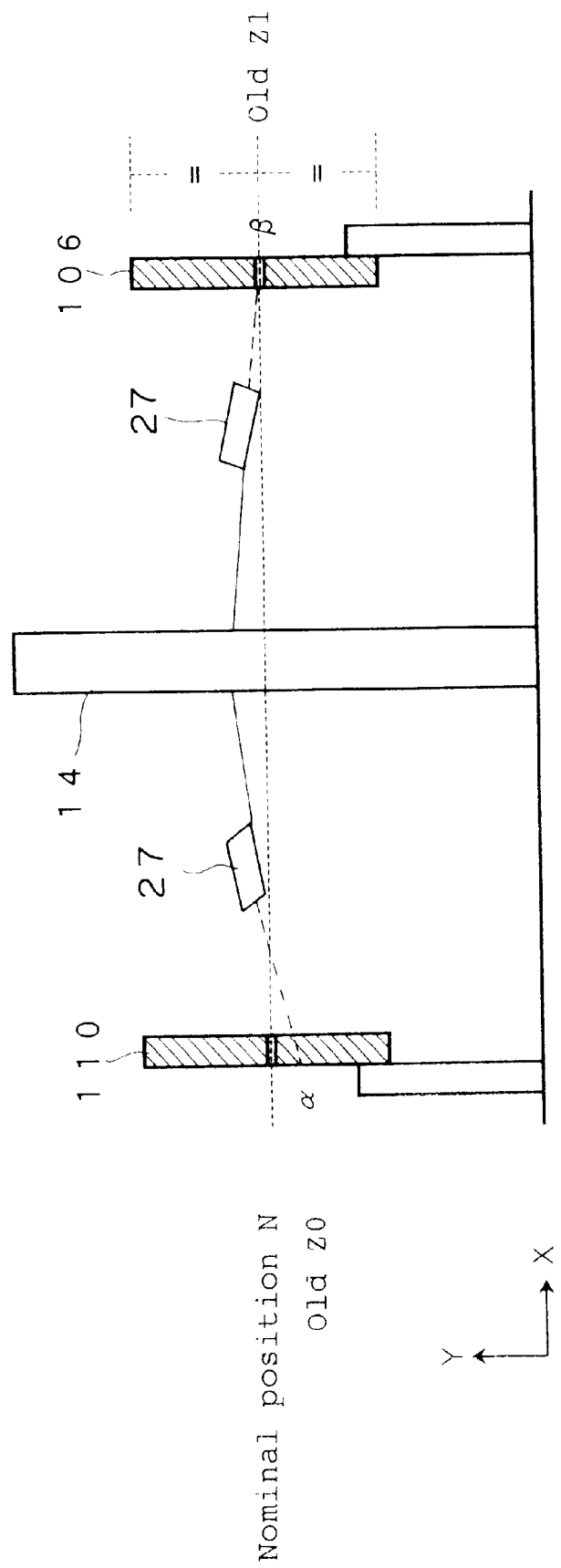
FIG. 24 is a diagram showing a relation between the positions of the rotation base and the reference flag in the relative-position measurement.

FIG. 23 is a diagram showing a relation between the positions of the rotation base 27 and the first and third reference flags 106 and 110 prior to replacement of the accessor. Let the assembly precision of the first reference flag 106 be guaranteed while that of the third reference flag 110 be not guaranteed. Since a relation of the positions in the Y direction between the rotation base 27 and the reference flags 106 and 110 at a relative-position measurement time prior to the replacement of the accessor is adjusted in such a way that the Z1 surface coincides with the nominal position N, the relative positions are measured with the rotation base 27 on the Z0 surface shifted by a difference $(\alpha-\beta)$ between the Z0 and Z1 surfaces as shown in FIG. 24.

Figure 25:
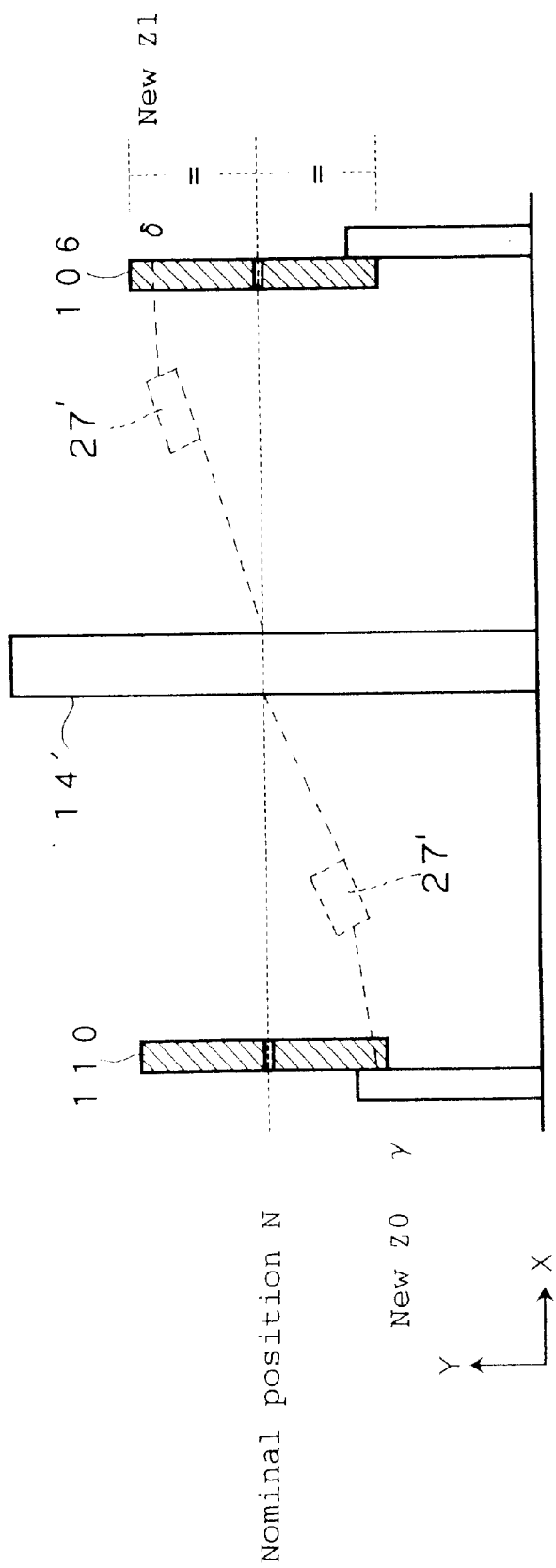
FIG. 25 is a diagram showing a relation between the positions of the rotation base and the reference flags after replacement of an accessor.

FIG. 25 is a diagram showing a relation between the positions of the rotation base 27' and the first and third reference flags 106 and 110 after replacement of the accessor. If the positions of the first and third reference flags 106 and 110 are measured in a state shown in FIG. 25, the position of the Z0 surface is shifted by a difference $(\gamma-\delta)$ in the Y direction because the Z1 surface is adjusted to coincide with the nominal position N. Positioning the Z0 surface in this state will cause the rotation base 27' to be shifted in the Y direction by the difference $(\gamma-\delta)$. In addition, since the positioning is carried out with the Z1 surface taken as a reference, the shift $(\alpha-\beta)$ from the nominal position N observed in the measurement of the relative position should also be added thereto as well.

In order to cope with the problem described above, in the present embodiment, when an access to the Z0 surface is made, correction data $\{(\alpha-\beta)+(\gamma-\delta)\}$ is subtracted from the correction value of the Z1 surface.

That is to say,

Old Z1 correction value=$\beta$−N,

Old Z0 correction value=$\alpha$−N,

New Z1 correction value=$\delta$−N and

New Z0 correction value=$\gamma$−N

Thus, $\beta$=Old Z1 correction value+N, $\alpha$=Old Z0 correction value+N, $\delta$=New Z1 correction value+N and $\gamma$=New Z0 correction value+N As a result, $(\alpha-\beta)+(\gamma-\delta)$=(New Z0 correction value+N−(New Z1 correction value+N)+(Old Z1 correction value+N−(Old Z0 correction value+N)) =(New Z0 correction value−New Z1 correction value)+(Old Z1 correction value−Old Z0 correction value)

FIG. 26 is a diagram showing relations of the positions of a position flag and a home sensor prior to and after replacement of the home sensor. As described above, the home flag 126 and the position sensor 128 are installed on the accessor 14. On the X rail 20, on the other hand, the X home sensor 130 and a plurality of home position flags 132 are provided at predetermined intervals of typically 30 cm.

Since the operation of the accessor 14 is based on tachometer count values, replacement of the home sensor 130 for initializing (or resetting) the tachometer count value makes it necessary to re-measure all the relative positions. Let the distance from the home sensor 130 to the position flag 132 prior to the replacement of the home 130 be $H_0$ whereas the distance from the home sensor 130 to the position flag 132 measured after the replacement of the home 130 be $H_1$.

Thus, if the accessor 14 is moved to an arbitrary target location after the replacement of the home sensor 130, the new real location of the accessor 14 will be shifted from the target location by a distance of $(H_1-H_0)$. It is therefore necessary to correct the positioning of the accessor 14 by adding the difference $(H_1-H_0)$ in the calculation of the tachometer count value in the X direction. In this way, the accessor 14 can be operated correctly without measuring all the relative positions even after the home sensor 30 of the X direction has been replaced. This holds true of the home sensors of the Y and Z directions.

Figure 28:
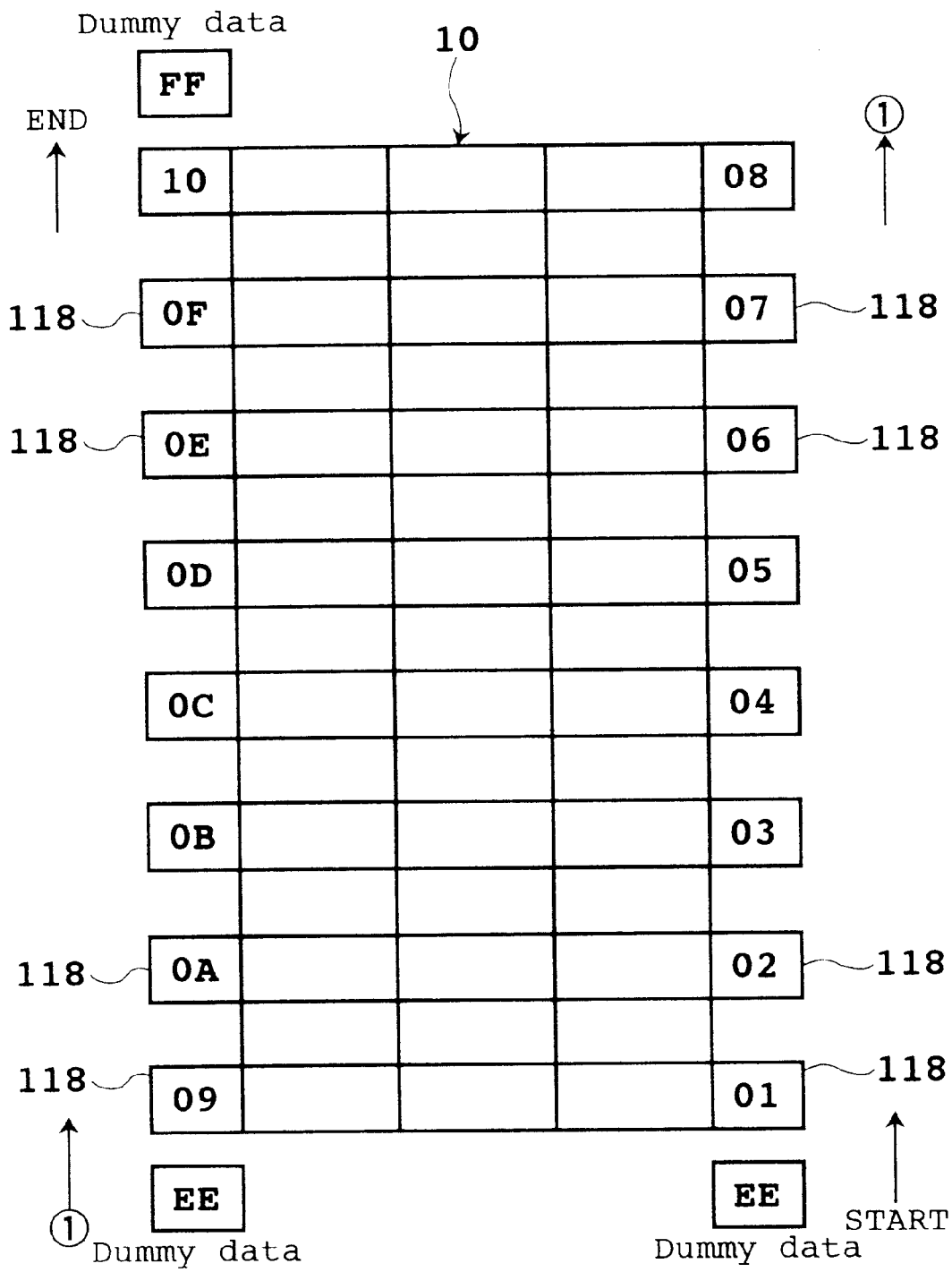
FIG. 28 is a diagram showing a measurement order and the arrangement of relative-position flags shown in the table of FIG. 27.

FIG. 27 is a diagram showing a typical relative-position flag measurement table expressed in the hexadecimal format. FIG. 28 is a diagram showing a measurement order and the arrangement of the relative-position flags 118 shown in the table of FIG. 27. In the measurement of a relative-position flag 118 in a cell drum 10 inclined to the X direction, the higher the installation position of the relative-position flag 118, the longer the distance to be corrected.

In the case of an amount of inclination of the cell drum 10 to the X direction equal to or greater than the width of the relative-position flag 118 provided on the upper portion of the cell drum 10, it is impossible to measure these relative-position flags 118. In order to solve this problem, when a next relative-position flag 118 is measured, correction data of the relative position found for the immediately preceding relative-position flag 118 is added to theoretical tachometer count values representing the coordinates of the next relative-position flag 118 in the measurement of the relative position.

In this way, the number of retry operations in the measurement of a relative position can be reduced, allowing the measurement time to be shortened substantially. In measurement of relative positions even for an inclined frame accommodating a cell drum 10, if relative positions are measured starting with a less affected lower relative-position flag in a bottom-up direction toward upper relative-position flags as is the case with the present embodiment, a correction value for the lower relative-position flag can be utilized, resulting in a big advantage.

Figure 29:
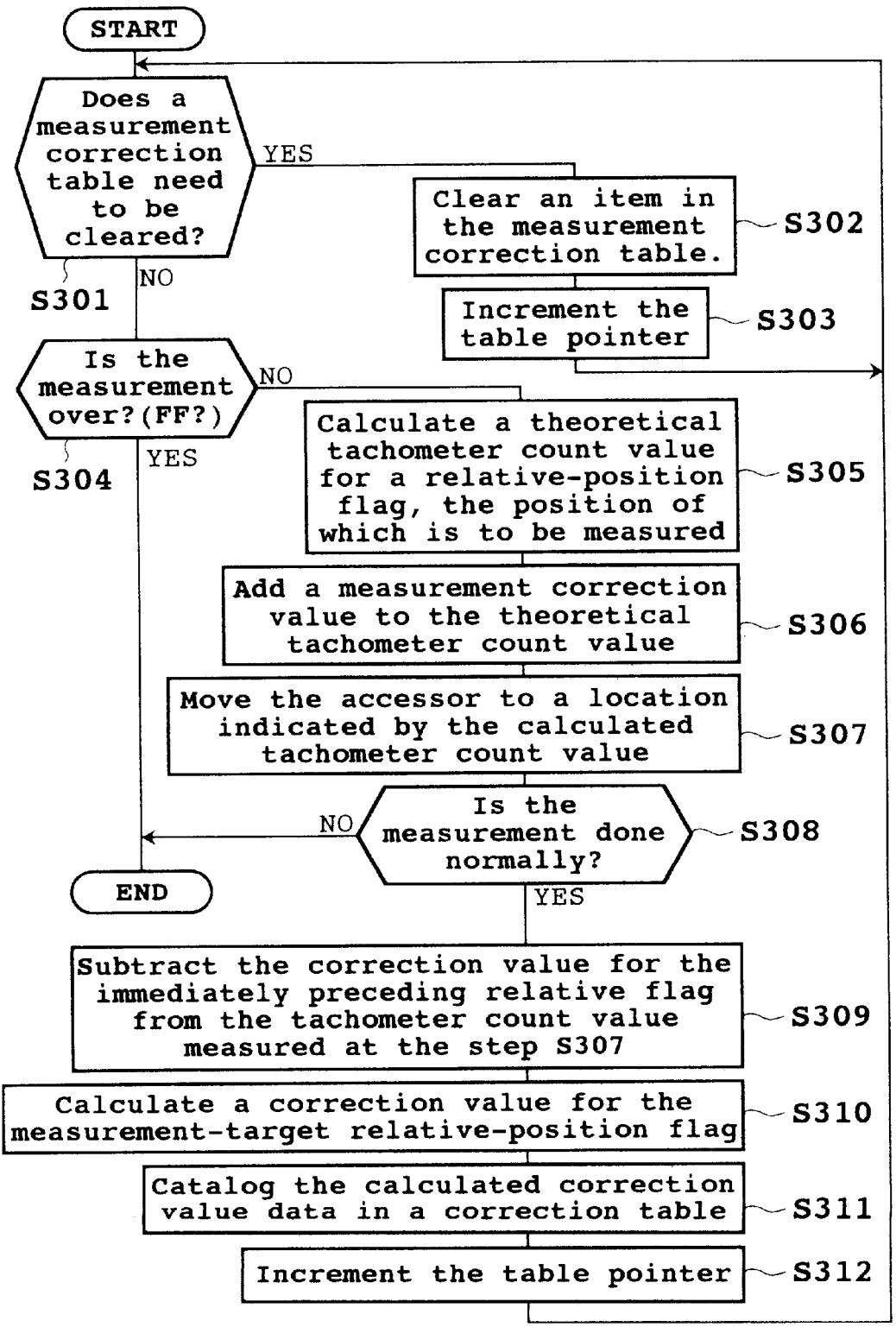
FIG. 29 is a flowchart of operations to measure the positions of relative-position flags.

Operations to measure relative-position flags described above are further explained in a concrete way by referring to a flowchart shown in FIG. 29. First of all, as shown in the figure, the flowchart begins with a step S301 to determine whether or not a measurement correction table needs to be cleared. If the processing to clear the measurement correction table is still required, the flow goes on to a step S302 at which data in the measurement correction table pointed to by a table pointer is cleared. The flow then proceeds to a step S303 at which the table pointer of the measurement correction table is incremented by one. The flow then returns to the step S301. The operations at the steps 301 to 303 are repeated till all the contents of the table are cleared in which case the flow continues to a step S304 to determine if the position of a relative-position flag 118 remains to be measured. If the position of a relative-position flag 118 remains to be measured, the flow goes on to a step S305 to measure the position of a remaining relative-position flag 118. The positions of the remaining relative-position flags 118 are measured sequentially one after another till the measurement of the positions of all the relative-position flags 118 is judged to be completed at the step S304.

At the step S305, a theoretical tachometer count value for a relative-position flag, the relative position of which is to be measured, is calculated. The flow then goes on to a step S306 at which a correction value for the immediately preceding relative-position flag is added to the theoretical tachometer count value for the current relative-position flag. The flow then proceeds to a step S307 at which the accessor 14 is moved to a location indicated by the tachometer count value calculated at the step S306 and the position of the target relative-position flag 118 is measured.

The flow then continues to a step S308 to determine whether or not the measurement is done normally. If the measurement is found done normally at the step S308, the flow goes on to a step S309 at which the correction value for the immediately preceding relative flag 118 is subtracted from the tachometer count value measured at the step S307. The flow then continues to a step S310 at which a correction value for the measurement-target relative-position flag 118 is calculated. Then, the flow proceeds to a step S311 at which the calculated correction value data is cataloged in the correction table. The flow then goes on to a step S312 at which the table pointer is incremented by one. Then, the flow returns to the step S304 through the step S301. In this way, the positions of the remaining relative-position flags 118 are measured sequentially one after another till the measurement of the positions of all the relative-position flags 118 is judged to be completed at the step S304.

Figure 30:
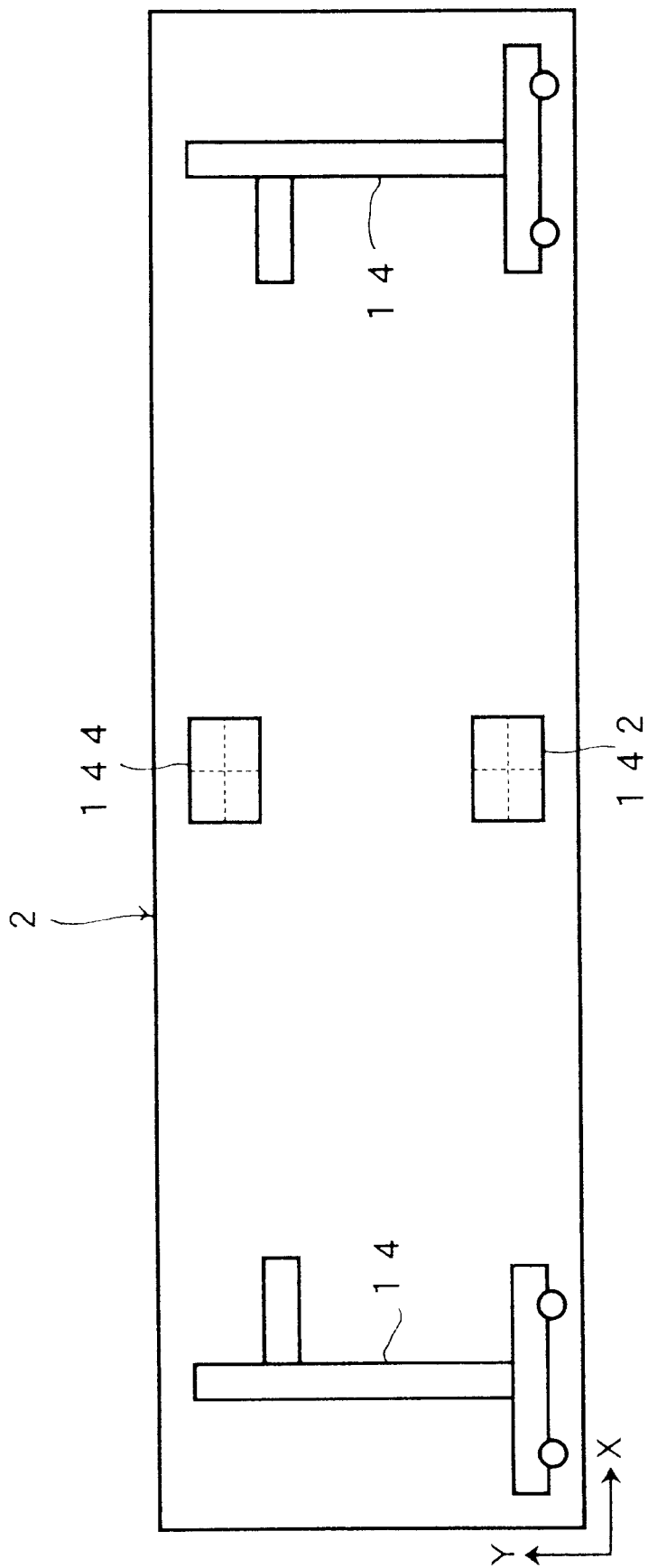
FIG. 30 is a diagram showing an embodiment using reference flags common to two accessors.

Next, an embodiment using reference flags common to two accessors 14 is explained by referring to FIG. 30. The common reference flags 142 and 144 are installed approximately at the center of the recording-medium library apparatus 2 so that they can be accessed by the two accessors 14. In the embodiment employing the common reference flags 142 and 144, it is necessary to provide a common interface that allows relative-position data to be shared by both the accessors 14.

Table 1 shows relative-position measurement steps with no reference flags common to accessors whereas Table 2 shows relative-position measurement steps with common reference flags.

TABLE 1

1. Measure the position of an R reference flag by using an R accessor
2. Measure the position of an L reference flag by using an L accessor
3. Measure relative positions in frame 1 by using the L accessor
4. Measure relative positions in frame 2 by using the L accessor
5. Measure relative positions in frame 1 by using the R accessor
6. Measure relative positions in frame 3 by using the L accessor
7. Measure relative positions in frame 2 by using the R accessor
8. Measure relative positions in frame 3 by using the R accessor
9. Save relative-position data of the L accessor
10. Save relative-position data of the R accesso

TABLE 2

1. Measure the position of a reference flag by using an R accessor
2. Measure the position of the reference flag by using an L accessor
3. Measure relative positions in frame 1 by using the R accessor
4. Measure relative positions in frame 2 by using the R accessor
5. Measure relative positions in frame 3 by using the R accessor
6. Save common relative-position data By comparison of Table 1 with Table 2, it is obvious that the number of measurement steps for the embodiment employing reference flags common to the accessors can be reduced by one-third and is yet sufficient for the embodiment to function normally. As a result, the measurement time can be shortened substantially. On the top of that, since relative-position data can be shared by the accessors, it is not necessary any more to control the operation to store of two different sets of relative-position data into two separate floppy disks respectively. In other words, both the accessors can be controlled by using the common relative-position data stored in a single floppy disk. In this way, the time required for the measurement of relative positions can be shortened and the relative-position data can be controlled with ease.

Figure 31:
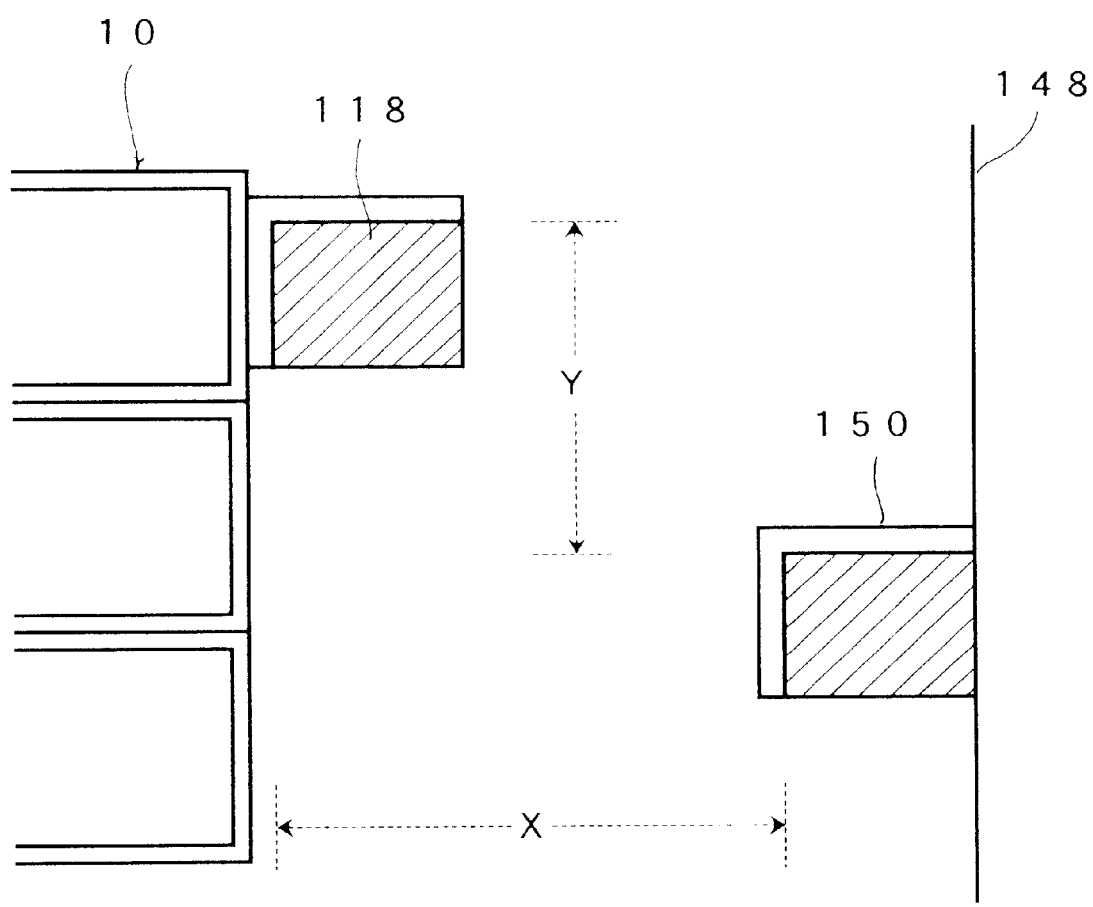
FIG. 31 is a diagram showing a relation between the positions of a drum reference flag and a relative-position flag.

Next, an embodiment having a drum reference flag is explained by referring to FIG. 31. As shown in the figure, a drum reference flag 150 is installed in a frame 148 in which a cell drum 10 is accommodated. A plurality of relative-position flags 118 are installed in the cell drum 10. It should be noted, however, that only one reference-position flag 118 is shown in the figure. According to the present embodiment, the relative positions of the drum reference flag 150 and the relative-position flag 118 are measured by using one of the accessors 14 and difference data representing the distance from the drum reference flag 150 to the relative-position flag 118 is stored in a memory unit of the cell drum 10.

The other accessor 14 needs only to measure the relative position of the drum reference flag 150 and read out the difference data from the memory unit of the cell drum 10. Correction values for the relative-position flag 118 are then computed from the difference data. An example of calculation of the correction values is explained as follows.

Let the difference data (X, Y) of the relative-position flag 118 stored in the memory unit of the cell drum 10 be (100 tachometer pulses, 150 tachometer pulses) and relative-position data of the drum reference flag 150 measured by the other accessor 14 be (200 tachometer pulses, 300 tachometer pulses). In this case, the tachometer count values of the relative-position flag 118 are computed as follows:

$$X = 100 + 200 = 300$$

$$Y = 150 + 300 = 450$$

Let the tachometer values of the relative-position flag 118 theoretically calculated in advance be (270 tachometer pulses, 430 tachometer pulses). In this case, correction values for the relative-position flag 118 are computed as follows:

$$X \text{ correction value} = 300 - 270 = 30$$

$$Y \text{ correction value} = 450 - 430 = 20$$

According to the present embodiment, the relative-position measurement time can thus be reduced.

Figure 32:
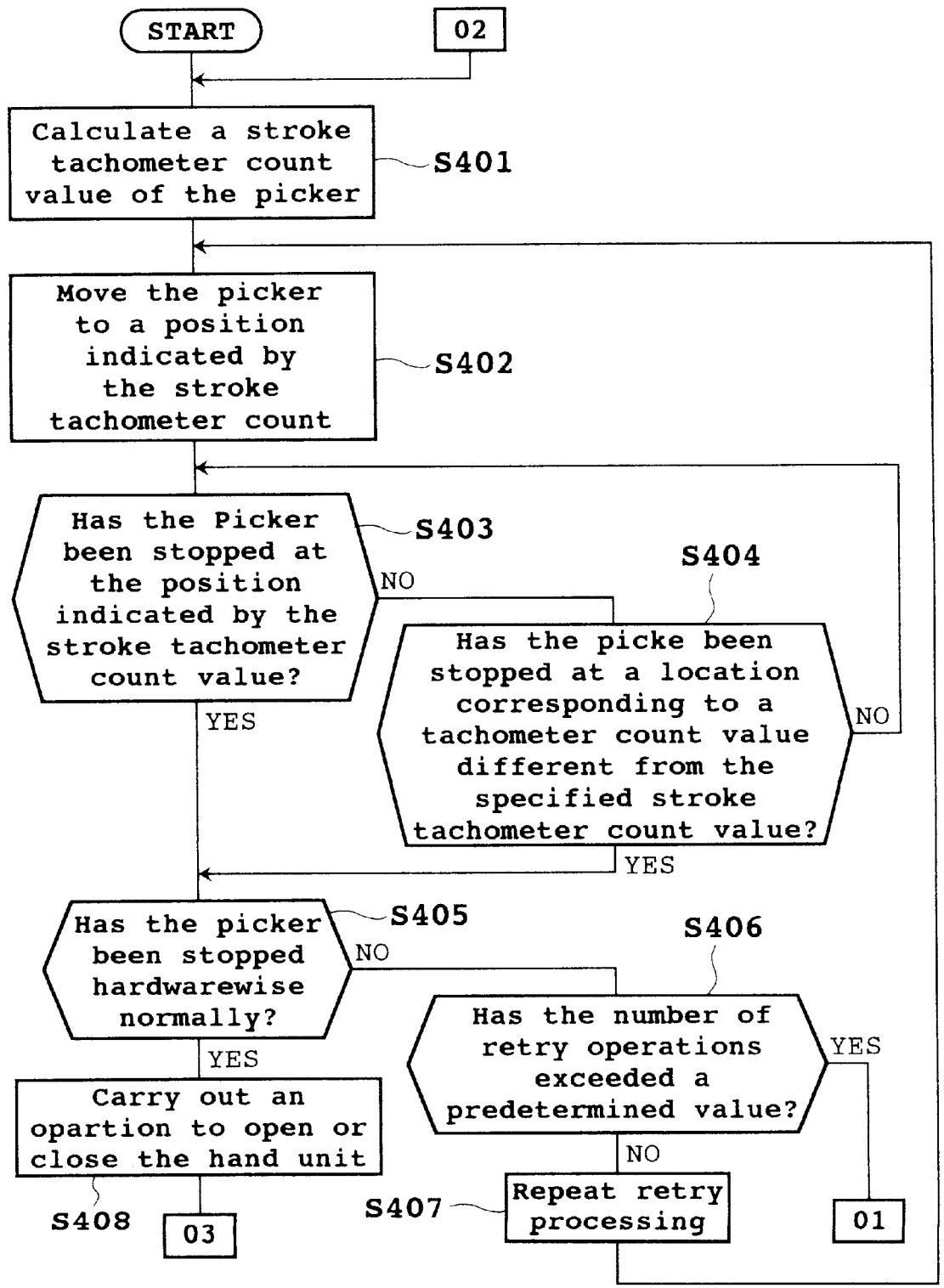
FIGS. 32 to 34 are diagrams showing a flow chart to be followed in carrying out retry processing.
Figure 33:
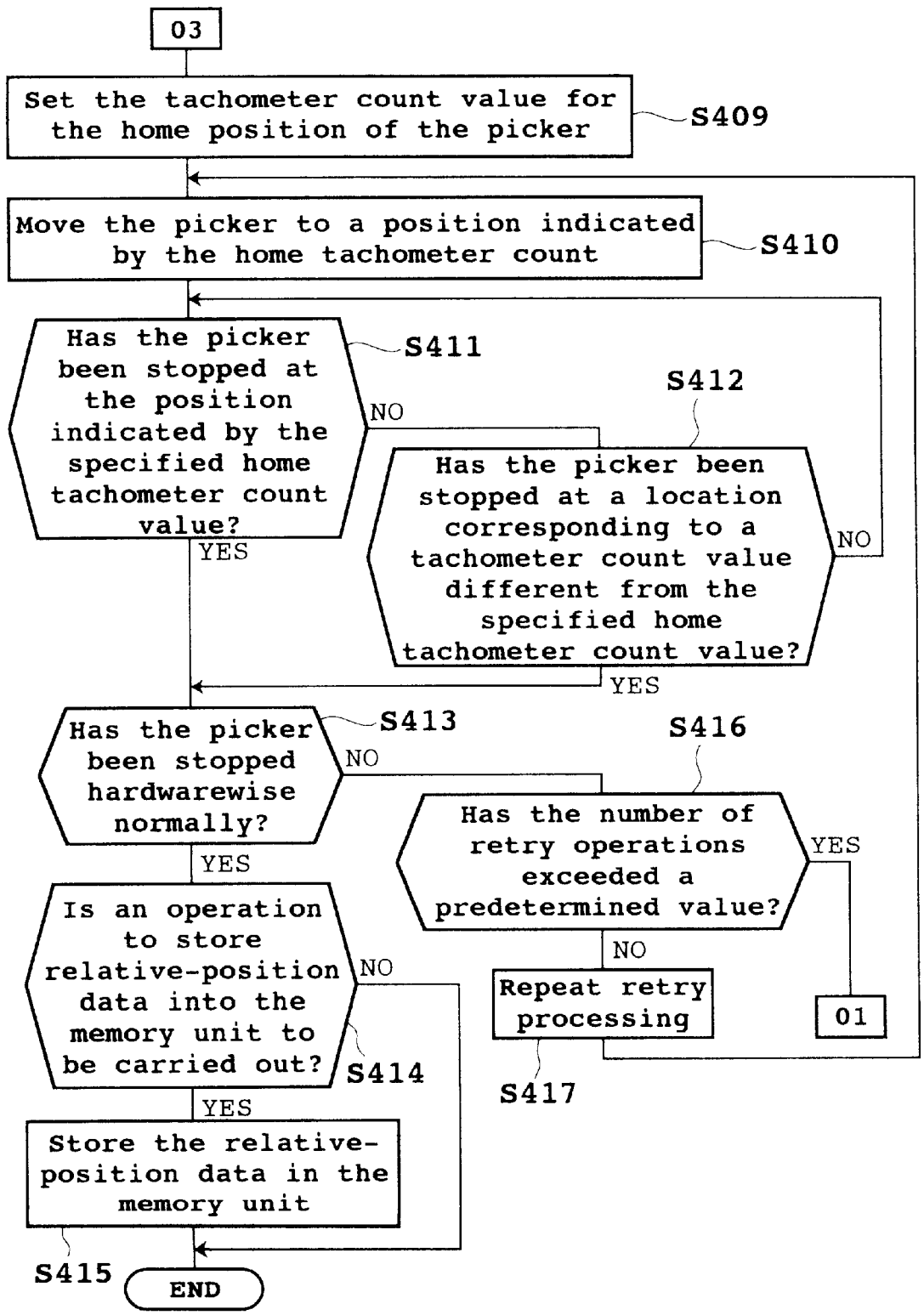
Figure 34:
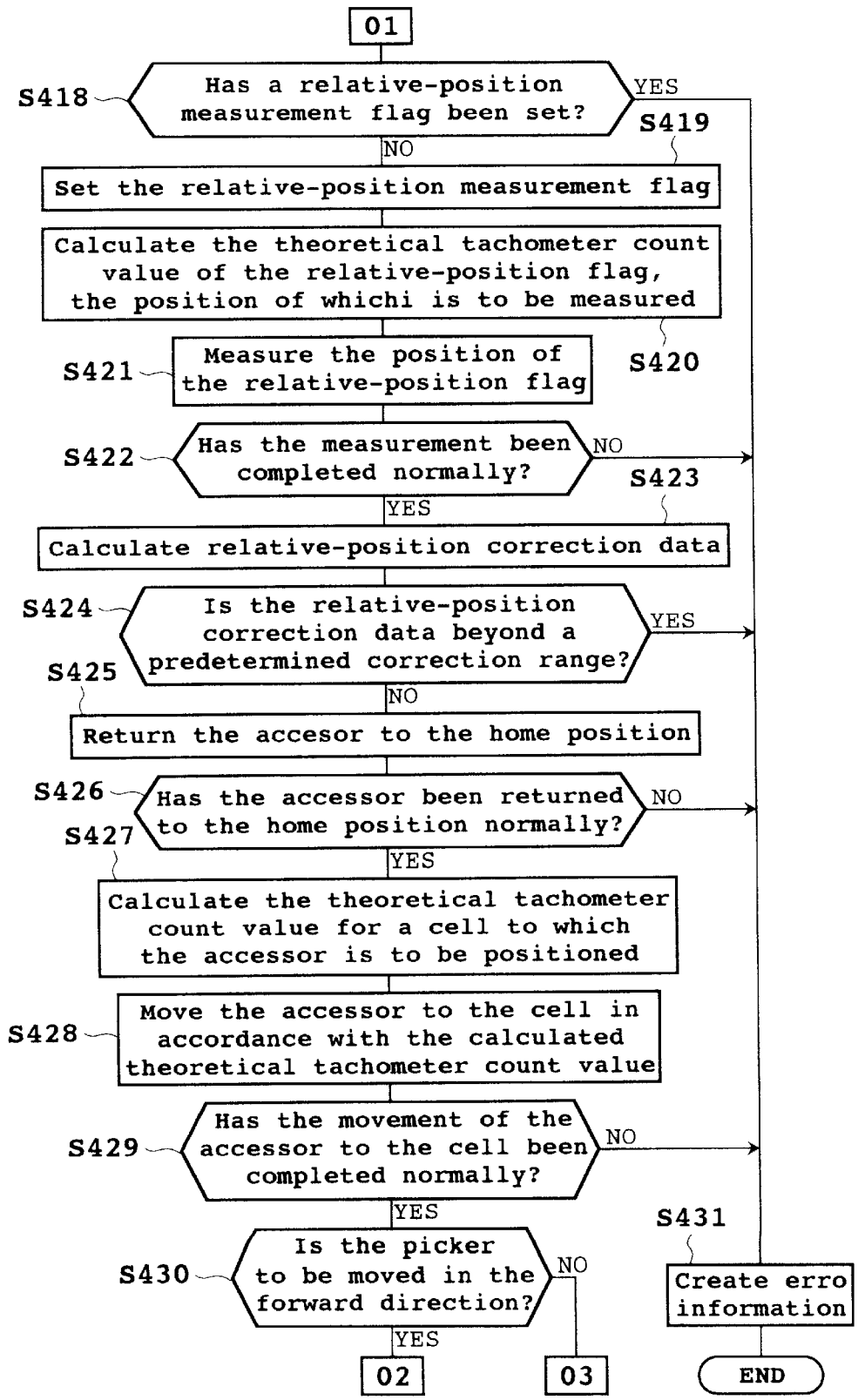

An embodiment with the gradients of the frame and the accessor causing a positioning shift of the accessor 14, thus, resulting in a state in which a select/restore operation can not be carried out is explained by referring to a flowchart shown in FIGS. 32 to 34. In the present embodiment, the relative position of a cell is re-measured and a correction value is computed before carrying out another select/restore operation.

First of all, at a step S401 shown in FIG. 32, a stroke tachometer count value of the picker 30 is calculated. The flow then goes on to a step S402 at which the picker 30 is moved to a position indicated by the stroke tachometer count value. The flow then proceeds to a step S403 to find out whether or not the picker 30 has been stopped at the position indicated by the stroke tachometer count value. If the picker 30 is found out not to have been stopped at the position indicated by the stroke tachometer count value at the step S403, the flow goes on to a step S404 to find whether or not the picker 30 has been stopped at a location corresponding to a tachometer count value different from the specified stroke tachometer count value. If the picker 30 is found stopped at either the step S403 or 404, the flow goes on to a step S405 to find out whether or not hardware wise the picker 30 has been stopped normally. If the picker 30 is found stopped abnormally at the step S405, the flow continues to a step S406 to find out whether or not the number of retry operations has exceeded a predetermined value. If the number of retry operations is found out to have not exceeded the predetermined value at the step S406, the flow goes on to a step S407 at which retry processing is repeated.

If the picker 30 is found stopped normally at the step S405, on the other hand, the flow continues to a step S408 at which an operation to open or close the hand unit is carried out. The flow then goes on to a step S409 at which the tachometer count value for the home position of the picker 30 is set. Then, the flow proceeds to a step S410 at which the picker is retreated to the home position. The flow then continues to a step S411 to find out whether or not the picker 30 has been stopped at the home position indicated by the specified tachometer count value. If the picker 30 is found out not to have been stopped at the home position indicated by the specified tachometer count value at the step S411, the flow goes on to a step S412 to find out whether or not the picker 30 has been stopped at a location corresponding to a tachometer count value different from the specified tachometer count value. If the picker 30 is found stopped at either the step S411 or 412, the flow goes on to a step S413 to find out whether or not hardware wise the picker 30 has been stopped normally.

If the picker 30 is found stopped abnormally at the step S413, the flow continues to a step S416 to find out whether or not the number of retry operations has exceeded a predetermined value. If the number of retry operations is found out to have not exceeded the predetermined value at the step S416, the flow goes on to a step S417 at which retry processing is repeated. If the picker 30 is found stopped normally at the step S413, on the other hand, the flow continues to a step S414 to find out whether or not an operation to store relative-position data into the memory unit is to be carried out. If the outcome of the judgment made at the step S414 is YES, the flow goes on to a step S415 at which the relative-position data is stored in the memory unit, ending the operations.

If the number of retry operations is found out to have exceeded the predetermined value at the step S406 or 416, on the other hand, the flow proceeds to a step S418 to find out whether or not a relative-position measurement flag has been set. If the relative-position measurement flag is found set at the step S418, the flow continues to a step S431 at which error information is created, ending the operations. If the relative-position measurement flag is found out to have not been set at the step S418, on the other hand, the flow goes on to a step S419 at which the relative-position measurement flag is set. The flow then proceeds to a step S420 at which the theoretical tachometer count value of the relative-position flag 118, the position of which is to be measured, is calculated. The flow then continues to a step S421 at which the relative position of the relative-position flag 118 is measured.

The flow then goes on to a step S422 to find out whether or not the measurement carried out at the step S421 has been completed normally. If the measurement carried out at the step S421 is found completed normally, the flow proceeds to a step S423 at which relative-position correction data is calculated. The flow then goes on to a step S424 to find out whether or not the relative-position correction data calculated at the step S423 is beyond a predetermined correction range. If the relative-position correction is found to be in the correction range at the step S424, the flow goes on to a step S425 at which the accessor 14 is returned to the home position. The flow then proceeds to a step S426 to find out whether or not the accessor 14 has been returned to the home position normally. If the accessor 14 is found returned to the home position normally at the step S426, the flow goes on to a step S427 at which the theoretical tachometer count value for a cell to which the accessor 14 is to be positioned is calculated. The flow then continues to a step S428 at which the accessor 14 is moved to the cell in accordance with the theoretical tachometer count value computed at the step S427.

Subsequently, the flow goes on to a step S429 to find out whether or not the movement of the accessor 14 to the cell has been completed normally. If the movement of the accessor 14 to the cell is found completed normally at the step S429, the flow continues to a step S430 to find out whether or not the picker 30 is to be moved in the forward direction. If the picker 30 is found out to be moved in the forward direction at the step S430, the flow goes on to the step S401. If the picker 30 is found out not to be moved in the forward direction at the step S430, on the other hand, the flow goes on to the step S409. If an operation is found completed abnormally at the step S422, 426 or 429 or the relative-position correction is found to be beyond the correction range at the step S424, on the other hand, the flow goes on to the step S431 at which error information is created, ending the operations.

The present invention has an effect that positions of cells of a cell drum relative to an accessor can be measured with a high degree of reliability and in a short period of time. On the top of that, the measurement of relative positions during maintenance work can be made simple.

What is claimed is:

1. A relative-position measuring system of a recording-medium library apparatus, said library apparatus including:

a housing; a cell drum which is rotatably installed in said housing and has a plurality of cells each for accommodating a recording-medium cartridge; a drive unit for writing and reading out data into and from said recording-medium cartridge; an X rail which is installed in said housing and has an X axis extended in a horizontal direction; and an accessor for conveying said recording-medium cartridge between said cell drum and said drive unit by moving said accessor along said X axis, said accessor having a hand mechanism movable in the vertical direction along a Y column extended in the vertical direction and rotatable around a Y axis parallel to said Y column;

said relative-position measuring system comprising:

a first reference flag installed at a front lower portion of said housing;

a second reference flag installed above said first reference flag;

a third reference flag which is installed at a rear lower portion of said housing in such a way that a straight line connecting said third reference flag to said first reference flag forms a right angle with said X rail;

a plurality of relative-position flags installed at said cell drum;

a home sensor installed on said X rail for detecting a home position of said accessor;

a flag sensor installed at said hand mechanism for detecting said first to third reference flags and said relative-position flags;

a first motor for moving said accessor along said X rail and, at the same time, generating a train of first tachometer pulses;

a first tachometer counter for counting said first tachometer pulses;

a second motor for moving said hand mechanism along said Y column and, at the same time, generating a train of second tachometer pulses;

a second tachometer counter for counting said second tachometer pulses;

a third motor for rotating said hand mechanism around said Y axis and, at the same time, generating a train of third tachometer pulses;

a third tachometer counter for counting said third tachometer pulses;

a means for finding a gradient of said Y axis of said accessor with respect to an X direction and gradients of a Z axis defined as a straight line connecting a rotation start point to a rotation end point of said hand mechanism with respect to said X direction and with respect to a Y direction by detecting said first to third reference flags using said flag sensor;

a means for finding first theoretical tachometer count values by correcting design tachometer count values of said reference-position flags using said gradients of said Y and Z axes of said accessor and storing said first theoretical tachometer count values;

a means for storing first actual tachometer count values of said first to third tachometer counters which are obtained when said relative-position flags are detected by said flag sensor; and a means for finding difference data between said first actual tachometer count values and said first theoretical tachometer count values and storing said difference data as first correction values.

2. A relative-position measuring system of a recording-medium library apparatus according to claim 1 wherein said hand mechanism includes a base; a hand unit slidable on said base between said pushed-forth position and a pulled-back position; a fourth motor for sliding said hand unit and, at the same time, generating a train of fourth tachometer pulses; and a recording-medium cartridge detecting sensor for sensing a recording-medium cartridge in each of said cells to be grasped by said hand unit; said relative-position measuring system further comprising:

a fourth tachometer counter for counting the fourth tachometer pulses generated by said hand mechanism;

a means for calculating a tachometer count value of said fourth tachometer counter representing a design stroke allowing the hand unit of said hand mechanism to grasp a recording-medium cartridge in a cell;

a means for storing said tachometer count value representing said design stroke as a second theoretical tachometer count value;

a means for storing a second actual tachometer count value which is contained in said fourth tachometer counter at the time said recording-medium cartridge detecting sensor is turned on in a movement of said hand unit to a pushed-forth position to grasp a recording-medium cartridge in a cell; and a means for calculating second difference data between said second actual tachometer count value and said second theoretical tachometer count value and storing said second difference data as a second correction value.

3. A relative-position measuring system of a recording-medium library apparatus according to claim 2 further comprising:

a means for storing a fifth theoretical tachometer count value for said second tachometer counter corresponding to the height of said first reference flag;

a means for storing a fifth actual tachometer count value contained in said second tachometer counter at the time said flag sensor senses said first reference flag with said hand unit located at said pulled-back position;

a means for finding fifth difference data between said fifth actual tachometer count value and said fifth theoretical tachometer count value and storing said fifth difference data as a fifth correction value;

a means for storing a sixth actual tachometer count value contained in said second tachometer counter at the time said flag sensor senses said first reference flag with said hand unit located at said pushed-forth position;

a means for finding sixth difference data between said sixth actual tachometer count value and said fifth theoretical tachometer count value and storing said sixth difference data as a sixth correction value; and a means for finding seventh difference data between said sixth correction value and said fifth correction value and storing said seventh difference data as a seventh correction value.

4. A relative-position measuring system of a recording-medium library apparatus according to claim 1 further comprising:

a means for storing a third theoretical count value for said third tachometer counter found from a design value at which said flag sensor senses said first reference flag;

a means for storing a third actual tachometer count value which is contained in said third tachometer counter at the time said flag sensor senses said first reference flag;

a means for finding third difference data between said third actual tachometer count value and said third theoretical tachometer count value and storing said third difference data as a third correction value;

a means for storing a fourth theoretical count value for said third tachometer counter found from a design value at which said flag sensor senses said second reference flag;

a means for storing a fourth actual tachometer count value which is contained in said third tachometer counter at the time said flag sensor senses said second reference flag; and a means for finding fourth difference data between said fourth actual tachometer count value and said fourth theoretical tachometer count value and storing said fourth difference data as a fourth correction value.

5. A relative-position measuring system of a recording-medium library apparatus according to claim 1 further comprising:

a means for storing a fifth theoretical tachometer count value for said second tachometer counter corresponding to the height of said first reference flag;

a means for finding a fifth actual tachometer count value contained in said second tachometer counter at the time said home sensor actually senses said first reference flag, calculating fifth difference data between said fifth actual tachometer count value and said fifth theoretical tachometer count value and storing said fifth difference data as a fifth correction value;

a means for finding a seventh actual tachometer count value contained in said second tachometer counter at the time said flag sensor actually senses said second reference flag, calculating eighth difference data between said seventh actual tachometer count value and said fifth theoretical tachometer count value and storing said eighth difference data as an eighth correction value;

a means for finding an eighth actual tachometer count value contained in said second tachometer counter at the time a new flag sensor of a replacement accessor actually senses said first reference flag, calculating ninth difference data between said eighth actual tachometer count value and said fifth theoretical tachometer count value and storing said ninth difference data as a ninth correction value;

a means for finding an ninth actual tachometer count value contained in said second tachometer counter at the time said new flag sensor actually senses said second reference flag, calculating tenth difference data between said ninth actual tachometer count value and said fifth theoretical tachometer count value and storing said tenth difference data as a tenth correction value;

a means for calculating eleventh difference data between said eighth and fifth correction values and storing said eleventh difference data as an eleventh correction value; and a means for calculating twelfth difference data between said tenth and ninth correction values and storing said twelfth difference data as a twelfth correction value.

6. A relative-position measuring system of a recording-medium library apparatus according to claim 1 further comprising a second accessor wherein said first to third reference flags are shared by said accessor and said second accessor.

7. A relative-position measuring system of a recording-medium library apparatus according to claim 1 further comprising:

a second accessor;

a drum reference flag installed on said cell drum;

a means for measuring relative positions of said drum reference flag and said relative-position flags by using said accessor, finding difference data representing relations between positions of said drum reference flag and said relative-position flags, and storing said difference data in said cell drum; and a means for fetching said difference data stored in said cell drum after a measurement of the relative position of said drum reference flag by using said second accessor and computing correction values for said second accessor from said difference data.

* * * * *